United States Patent
Jo et al.

(10) Patent No.: US 9,191,947 B2
(45) Date of Patent: Nov. 17, 2015

(54) METHOD FOR CONTENTION-BASED SCHEDULING OF DOWNLINK SIGNAL TRANSMISSIONS

(75) Inventors: Jun Ho Jo, Gyeonggi-do (KR); Sae Woong Bahk, Seoul (KR); Sang Kyu Park, Seoul (KR); Ki Jun Kim, Gyeonggi-do (KR); Sung Guk Yoon, Gyeonggi-do (KR)

(73) Assignees: LG Electronics Inc., Seoul (KR); SNU R&DB Foundation, Seoul (KR)

( * ) Notice: Subject to any disclaimer, the term of this patent is extended or adjusted under 35 U.S.C. 154(b) by 478 days.

(21) Appl. No.: 13/876,866

(22) PCT Filed: Nov. 30, 2010

(86) PCT No.: PCT/KR2010/008516
§ 371 (c)(1),
(2), (4) Date: Apr. 19, 2013

(87) PCT Pub. No.: WO2012/043930
PCT Pub. Date: Apr. 5, 2012

(65) Prior Publication Data
US 2013/0301511 A1   Nov. 14, 2013

(30) Foreign Application Priority Data

Sep. 30, 2010 (KR) .......... 10-2010-0095200
Sep. 30, 2010 (KR) .......... 10-2010-0095201

(51) Int. Cl.
*H04W 72/04* (2009.01)
*H04W 72/10* (2009.01)
(Continued)

(52) U.S. Cl.
CPC .......... *H04W 72/0426* (2013.01); *H04W 72/10* (2013.01); *H04L 1/1867* (2013.01); *H04L 5/0048* (2013.01); *H04L 5/0053* (2013.01); *H04L 5/0064* (2013.01); *H04L 5/0091* (2013.01)

(58) Field of Classification Search
CPC . H04W 72/04; H04W 72/0426; H04W 72/10; H04L 1/1867; H04L 5/0048; H04L 5/0053; H04L 5/0064; H04L 5/0091
USPC .......................................... 370/312, 329, 447
See application file for complete search history.

(56) References Cited

U.S. PATENT DOCUMENTS

2008/0175265 A1* 7/2008 Yonge .................... H04B 3/54
370/447

FOREIGN PATENT DOCUMENTS

CN          1553715 A      12/2004
KR   10-2008-0029912 A      4/2008
(Continued)

OTHER PUBLICATIONS

International Search Report issued in corresponding International Patent Application No. PCT/KR2010/008516 dated Oct. 21, 2011.
(Continued)

Primary Examiner — Mark Rinehart
Assistant Examiner — Natali N Pascual Peguero
(74) Attorney, Agent, or Firm — Morgan, Lewis & Bockius LLP

(57) ABSTRACT

A method and apparatus for operating a UE and a BS to perform contention-based scheduling of downlink signal transmissions are disclosed. The method includes receiving, from at least one of BSs adjacent to the UE, a channel carrying inter-BS contention information for downlink signal transmission in an $(n+1)^{th}$ time unit, n being an integer, broadcasting to the BSs a contention number with a highest priority level among contention numbers extracted from the inter-BS contention information, and receiving a downlink signal from a BS that transmitted inter-BS contention information related to the contention number with the highest priority level in the $(n+1)^{th}$ time unit.

19 Claims, 22 Drawing Sheets

(51) Int. Cl.
*H04L 1/18* (2006.01)
*H04L 5/00* (2006.01)

(56) References Cited

FOREIGN PATENT DOCUMENTS

| KR | 10-2009-0088548 A | 8/2009 |
| WO | 2009/072712 A1 | 6/2009 |
| WO | 2010/107165 A1 | 9/2010 |

OTHER PUBLICATIONS

Chinese Office Action dated Aug. 5, 2015, in Chinese Patent Application No. 201080069360.7.

\* cited by examiner

METHOD FOR CONTENTION-BASED SCHEDULING OF DOWNLINK SIGNAL TRANSMISSIONS

TECHNICAL FIELD

The present invention relates to a method and apparatus for operating a User Equipment (UE) and a Base Station (BS) to schedule downlink signal transmissions in a contention-based manner.

BACKGROUND ART

In a wireless communication system, BSs use frequency, power or code resources to reduce mutual interference.

In a frequency-based inter-BS interference control scheme, different frequencies are allocated to adjacent BSs so that interference does not physically reach the BSs. A power-based inter-BS interference control scheme regulates that power equal to or higher than a predetermined level is not used in order to avoid severe interference between BSs or UEs. Interference can be reduced by allocating different quasi-orthogonal codes to BSs so that the BSs transmit signals by multiplying them by their allocated unique codes. This is a code-based inter-BS interference control scheme. When inter-BS interference is controlled using frequency, perfectly different frequencies may be allocated to BSs, or partially overlapped frequencies may be allocated to BSs while a perfectly different frequency is allocated only to cell-edge users. In addition, a hybrid interference control scheme is also widely used, in which interference is controlled using frequency, power and code resources in combination.

The recent development trend of wireless communication systems is toward high data rates and service quality for supporting multimedia, beyond voice service. The transmission rate of data depends on the transmission power of the data and a frequency bandwidth used for the data transmission. Recently, a femtocell BS (a femto BS or a Femto Access Point (FAP)) has attracted attention as an approach to increasing the utilization (reuse) of frequency resources.

FIG. 1 illustrates the configuration of a wireless communication system having femtocell BSs.

Referring to FIG. 1, the wireless communication system may include a femtocell BS 110, a macrocell BS 120, a Femto Network Gateway (FNG) 130, an Access Service Network (ASN) 140, and a Connectivity Service Network (CSN) 150. The macrocell BS 120 is a legacy BS in a conventional wireless communication system.

The femtocell BS 110 is a small-size version of the macrocell BS 120 and thus may perform most of the functions of the macrocell BS 120. The femtocell BS 110 directly accesses a Transmission Control Protocol/Internet Protocol (TCP/IP) network and independently operates like the macrocell BS 120. The femtocell BS 110 covers 0.1 m to 30 m and may serve 10 to 20 UEs. The femtocell BS 110 may operate in the same frequency as or a different frequency from the macrocell BS 120.

The femtocell BS 110 is connected to the macrocell BS 120 via an R1 interface, for receiving a downlink channel from the macrocell BS 120 and transmitting a control signal to the macrocell BS 120.

The femtocell BS 110 may cover an indoor area or a shadowing area that the macrocell BS 120 cannot cover, and may also support high-rate data transmission. The femtocell BS 110 may be overlaid on a macrocell or installed non-overlaid in an area that the macrocell BS 120 does not cover.

There are two types of femtocell BSs, Closed Subscriber Group (CSG) femtocell BSs and Open Subscriber Group (OSG) femtocell BSs. A CSG femtocell BS groups UEs that can access it and assigns a CSG Identification (ID) to the group of UEs. Hence, the CSG femtocell BS is accessible only to the UEs having the CSG ID. In contrast, an OSG femtocell BS is accessible to all UEs.

The FNG 130, which is a gateway for controlling the femtocell BS 110, is connected to the ASN 140 and the CSN 150 via an Rx interface and an Ry interface, respectively. The femtocell BS 110 may receive a service from the CSN 150 through the FNG 130. A Mobile Station (MS) connected to the femtocell BS 110 may receive services such as authentication, Internet protocol Multimedia Subsystem (IMS) service, etc. from the FNG 130 or the CSN 150. The CSN 150 provides connectivity to an application service such as the Internet, Voice over IP (VoIP), etc, and provides authentication and billing functions to the UE. The ASN 140 controls the macrocell BS 120 and manages a connection between the macrocell BS 120 and the CSN 150.

A femtocell BS is an ultra small BS having small service coverage. Since the number of BSs per unit area has been increased and the number of users per BS has been decreased remarkably, more frequency resources are allocated to each user in effect. However, femtocell BSs are purchased and installed by users and thus the deployment positions of the femtocell BSs are not only difficult to estimate and but also variable. Moreover, along with the proliferation of femtocell BSs, the femtocell BSs are distributed densely and thus it is expected that interference between femtocell BSs is more severe than interference between legacy BSs (operated by mobile communication service providers). Unlike the legacy BSs, there is no direct link between femtocell BSs, which makes it difficult to solve the interference problem by conventional power-based or code-based interference control schemes or through direct cooperation between BSs.

While scheduling downlink signal transmissions of adjacent BSs based on contention between them is under discussion in order to solve the afore-described problem, there exists a need for additional discussion about how the contention-based scheduling is to be performed.

The conventional interference control schemes are characterized in that a central controller allocates unique frequency or code resources to adjacent BSs in order to reduce interference between them. Considering the current rapid growth of mobile communication systems, more and more BSs will be distributed densely in future wireless communication systems. Despite the benefit of effective cancellation of inter-BS interference, the centralized interference control scheme has limitations in extensibility.

Under an environment in which there is a lack of computing power and a plurality of FAPs or Wireless Local Area Network (WLAN) APs are deployed in a manner not planned by communication service providers, the conventional centralized interference control scheme requires a large volume of computation and is not effective in controlling interference.

Moreover, unlike WLAN APs which are expected to be deployed without planning, FAPs operate in a cellular network system based on cooperation. Therefore, the FAPs may cause a more severe interference problem. In addition, if future FAPs have so large capacities as to accommodate 10 or more UEs, there exists a need for a new scheduling method for reducing inter-BS interference and improving communication performance.

For this purpose, a contention-based scheduling technique for downlink signal transmissions of BSs is under discussion. However, an additional discussion is needed to ensure fairness between BSs.

DISCLOSURE

Technical Problem

An object of the present invention devised to solve the problem lies on a method for efficiently scheduling downlink signal transmissions in a contention-based manner.

Another object of the present invention devised to solve the problem lies on a UE and a BS for efficiently scheduling downlink signal transmissions in a contention-based manner and a method for efficiently operating the UE and the BS in a $3^{rd}$ Generation Partnership Project (3GPP) Long Term Evolution (LTE) system.

A further object of the present invention devised to solve the problem lies on a method for ensuring short-term fairness as well as long-term fairness in a system where interference between BSs is reduced through time scheduling.

Technical Solution

The object of the present invention can be achieved by providing a method for controlling downlink signal transmissions of BSs adjacent to a UE based on contention between the BSs, including receiving, from at least one of the BSs, a channel carrying inter-BS contention information for downlink signal transmission in an $(n+1)^{th}$ time unit, n being an integer, broadcasting to the BSs a contention number with a highest priority level among contention numbers extracted from the inter-BS contention information, and receiving a downlink signal from a BS that transmitted inter-BS contention information related to the contention number with the highest priority level in the $(n+1)^{th}$ time unit.

The channel carrying the inter-BS contention information may be a Physical Broadcast Channel (PBCH).

The inter-BS contention information may be included in a Master Information Block (MIB).

The inter-BS contention information may include information indicating whether the BS is operating in contention mode and information required for extracting a contention number.

The information required for extracting a contention number may be one of the contention number, an input value to a function stored in the UE and the BSs, for extraction of a contention number, and information about a channel carrying the contention number.

If the information required for extracting the contention number is information about a channel carrying the contention number, the inter-BS contention information may be received on the PBCH and the contention number may be received on a Physical Downlink Control CHannel (PDCCH).

The contention number with the highest priority level may be broadcast as a tone signal to the BSs K times repeatedly, K being a natural number.

Information indicating the presence or absence of a BS that does not perform the contention-based downlink signal transmission control among the BSs adjacent to the UE may be additionally broadcast.

If the number of the BSs adjacent to the UE is L, a distance between a $k^{th}$ BS and the UE is d, a path loss index is a, an antenna gain is A, and a threshold power for detecting the tone signal is detected is $P_{th}$, transmission power of the tone signal for the $k^{th}$ BS may be computed by the following equation, $$P_k = \frac{d^a}{A} P_{th}$$

where k=0, 1, ..., L−1, and transmission power of the tone signal is determined by the following equation, $$P_{tone} = \max\{P_1, P_2, \ldots, P_k, \ldots, P_L\}$$

The MIB may include downlink system information, Physical Hybrid-ARQ Indicator Channel (PHICH)-related information, a System Frame Number (SFN), and the inter-BS contention information. The inter-BS contention information may include 1-bit information indicating whether the BS supports contention mode, 1-bit information indicating whether the BS is operating in the contention mode, and 1-bit information indicating whether the BS transmits a downlink signal in an $n^{th}$ time unit.

The inter-BS contention information may further include contention number information in an MIB. If the contention number information is included in an MIB, the contention number information may be received separately on a plurality of PBCHs. The MIB may include information indicating a position of a contention number in a PDCCH.

In another aspect of the present invention, provided herein is a method for transmitting a downlink signal to a UE based on contention among BSs adjacent to the UE at a BS being one of the adjacent BSs, including transmitting a channel carrying inter-BS contention information for downlink signal transmission in an $(n+1)^{th}$ time unit, receiving from the UE a contention number with a highest priority level among contention numbers extracted from inter-BS contention information transmitted to the UE by the BSs, and transmitting to the UE a downlink signal in the $(n+1)^{th}$ time unit if the BS is related to the contention number with the highest priority level. Herein, n is an integer.

In another aspect of the present invention, provided herein is a UE apparatus for controlling downlink signal transmissions of BSs adjacent to the UE based on contention between the BSs, including a reception module for receiving, from at least one of the BSs, a channel carrying inter-BS contention information for downlink signal transmission in an $(n+1)^{th}$ time unit, n being an integer, and a transmission module for broadcasting to the BSs a contention number with a highest priority level among contention numbers extracted from the inter-BS contention information. The reception module receives a downlink signal from a BS that transmitted inter-BS contention information related to the contention number with the highest priority level in the $(n+1)^{th}$ time unit.

In another aspect of the present invention, provided herein is a BS apparatus for transmitting a downlink signal to a UE based on contention among BSs adjacent to the UE, including a transmission module for transmitting a channel carrying inter-BS contention information for downlink signal transmission in an $(n+1)^{th}$ time unit, and a reception module for receiving from the UE a contention number with a highest priority level among content numbers extracted from inter-BS contention information transmitted to the UE by the BSs. The transmission module transmits to the UE a downlink signal in the $(n+1)^{th}$ time unit if the BS is related to the contention number with the highest priority level. Herein, n is an integer.

In another aspect of the present invention, provided herein is a method for transmitting and receiving a signal to and from a UE at a BS being one of BSs adjacent to the UE in a wireless communication system where each of the adjacent BSs is scheduled based on contention, including transmitting to the UE information about a number selected randomly from a class corresponding to a priority level of the BS among classes corresponding to a predetermined number of priority levels on a predetermined downlink channel in a first time unit, and transmitting and receiving a signal to and from the UE in a second time unit according to identification information identifying a BS, received from the UE, to transmit and receive a signal in the second time unit among the adjacent BSs or whether a signal indicating transmission and reception in the second unit is not available has been received from the UE. The priority level of each of the adjacent BSs is determined according to a number of UEs within the BS and a number of time units during which the BS has been idle without signal transmission before the second time unit.

The priority level of each of the adjacent BSs may be determined according to a default priority level of the at least one BS, expressed as $f_x(W_x+1)$ where $f_x$ denotes a ratio of dividing a total number of UEs within the BSs adjacent to the UE by the number of UEs within the BS and $W_x$ denotes the number of time units during which the BS has been idle without signal transmission before the second time unit.

The priority level of each of the adjacent BSs may also be determined according to a complementary priority level of the BS, expressed as $$P_X = DP_x \text{(with probability } 1-f_x\text{)}$$

$$DP_x+1 \text{(with probability } f_x\text{)}$$

where $P_x$ denotes the complementary priority level of the BS and $DP_x$ denotes the default priority level of the BS.

The predetermined number of priority levels may be 2 and a most significant bit of the information about the selected number may indicate a priority level. The predetermined number of priority levels may be 4 and two most significant bits of the information about the selected number may indicate a priority level.

In another aspect of the present invention, provided herein is a method for scheduling signal transmission and receptions of BSs adjacent to a UE at the UE in a wireless communication system, including receiving from each of the adjacent BSs information about a number selected randomly from a class corresponding to a priority level of the BS among classes corresponding to a predetermined number of priority levels on a predetermined downlink channel in a first time unit, selecting a BS to transmit and receive a signal in a second time unit from among the adjacent BSs using the information about selected numbers received from the adjacent BSs according to a preset rule, and broadcasting identification information identifying the selected BS or transmitting a signal indicating transmission and reception in the second unit is not available to remaining adjacent BSs other than the selected BS. The priority level of each of the adjacent BSs is determined according to a number of UEs within the BS and a number of time units during which the BS has been idle without signal transmission before the second time unit.

In another aspect of the present invention, provided herein is a BS apparatus for transmitting and receiving a signal to and from a UE at a BS being one of BSs adjacent to the UE in a wireless communication system where each of the adjacent BSs is scheduled based on contention, including a transmission module for transmitting a signal to the UE, a reception module for receiving a signal from the UE, and a controller for, if a number is selected randomly from a class corresponding to a priority level of the BS among classes corresponding to a predetermined number of priority levels and the transmission module transmits information about the selected number on a predetermined downlink channel in a first time unit, controlling the transmission module and the reception module to transmit and receive a signal to and from the UE in a second time unit according to identification information identifying a BS, received from the UE, to transmit and receive a signal in the second time unit among the adjacent BSs or whether a signal indicating transmission and reception in the second unit is not available has been received from the UE. The priority level of each of the adjacent BSs is determined according to a number of UEs within the BS and a number of time units during which the BS has been idle without signal transmission before the second time unit.

In a further aspect of the present invention, provided herein is a UE apparatus for scheduling signal transmission and receptions of BSs adjacent to a UE in a wireless communication system, including a reception module for receiving from each of the adjacent BSs information about a number selected randomly from a class corresponding to a priority level of the BS among classes corresponding to a predetermined number of priority levels on a predetermined downlink channel in a first time unit, a processor for selecting a BS to transmit and receive a signal in a second time unit from among the adjacent BSs using the information about selected numbers received from the adjacent BSs according to a preset rule, and a transmission module for transmitting signals to the adjacent BSs. The processor broadcasts identification information identifying the selected BS through the transmission module or transmits a signal indicating transmission and reception in the second unit is not available to remaining adjacent BSs other than the selected BS through the transmission module. The priority level of each of the adjacent BSs is determined according to a number of UEs within the BS and a number of time units during which the BS has been idle without signal transmission before the second time unit.

Advantageous Effects

According to embodiments of the present invention, downlink signal transmission can be efficiently scheduled in a contention-based manner.

Especially in a 3GPP LTE system, a UE and a BS for performing contention-based scheduling of downlink signal transmission without defining an additional channel and a method for efficiently operating the UE and the BS are provided. Specifically, each BS transmits contention information on a Physical Broadcast Channel (PBCH) defined in the 3GPP LTE system and a UE broadcasts a contention number with a highest priority level. Hence, signaling overhead is decreased, compared to a method for indicating whether each BS has won a contention.

In the case where each UE transmits contention information (a maximum contention number among contention numbers of adjacent neighbors and the presence or absence of a BS that does not support contention mode or a BS that is not operating in the contention mode) K times repeatedly, each BS can more reliably extract contention numbers broadcast by UEs supporting the contention mode even though UEs adjacent to the BS, which do not support the contention mode, transmit uplink signals.

A contention-mode BS may wrongly determine that it is a winner or a loser when it is a loser or a winner in fact. This is referred to as a wrong contention result. If the BS has won a contention (i.e. when the BS generated a higher contention number than its adjacent BSs), even though a neighboring UE not supporting the contention mode interferes a specific subcarrier K times successively and thus the BS extracts a wrong highest contention number, the BS determines that it has lost the contention only when the wrong highest contention number is higher than the contention number generated by the BS. In the opposite case, if the BS has lost a contention (i.e. when the BS generated a lower contention number than an adjacent BS), even though a neighboring UE not supporting the contention mode interferes a subcarrier, the BS determines that it has lost the contention because the BS can extract a highest contention number transmitted by a UE. Therefore, even when a contention-mode BS receives an inaccurate tone signal due to interference from tone signals broadcast by adjacent UEs not supporting the contention mode or UEs outside a contention area, the influence of the inaccurate tone signal on the result of a contention can be reduced.

In addition, the embodiments of the present invention provide a method for efficiently scheduling downlink signal transmissions based on contention. Especially in a system that reduces inter-BS interference through time scheduling, short-term fairness as well as long-term fairness can be ensured.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
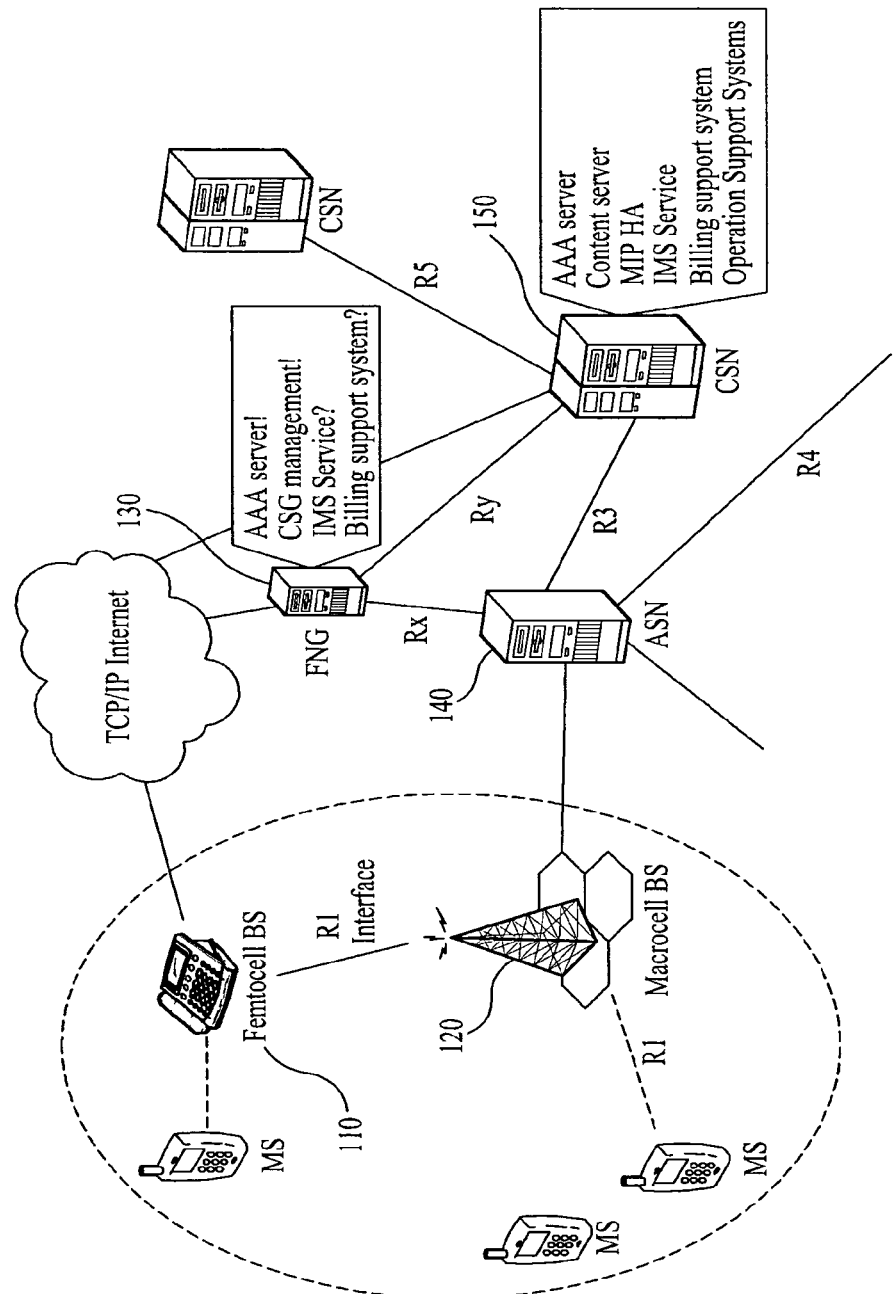
FIG. 1 illustrates the configuration of a wireless communication system having femtocell Base Stations (BSs).

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a $3^{rd}$ Generation Partnership Project (3GPP) Long Term Evolution (LTE) system is being used. However, the description is applicable to any other mobile communication system except for specific features inherent to the 3GPP LTE system.

In some instances, known structures and devices are omitted or are shown in block diagram form, focusing on important features of the structures and devices, so as not to obscure the concept of the present invention. The same reference numbers will be used throughout this specification to refer to the same or like parts.

In the following description, the term "terminal" generically refers to a mobile or fixed user terminal device such as a User Equipment (UE), a Mobile Station (MS), etc. and the term 'Base Station (BS)' is assumed to refer to any node of a network end, such as a Node B, an enhanced Node B (eNB or eNode B), etc., communicating with a UE.

In a mobile communication system, a UE may receive information from a BS on a downlink and may transmit information to the BS on an uplink. The information transmitted from or received at the UE may include data and control information, and a variety of physical channels are defined according to the types and usages of the transmission and received information.

As stated before, the following description will be given of a method for efficiently scheduling downlink signal transmissions in a contention-based manner. For this purpose, the inventor of the present invention proposed a channel access method based on contention between BSs and the result of the contention in U.S. patent application Ser. No. 12/556,361

(referred to as '361 application) filed on Sep. 9, 2009. In the '361 application, the inventor proposed a solution to inter-BS interference in an environment where BSs are densely distributed. According to the '361 application, each BS selects a random number for contention (hereinafter, referred to as a contention number) during each contention period. If the selected contention number has a higher priority level than contention numbers selected by adjacent BSs within an interference area, the BS determines that it has won the contention and thus accesses a channel. As a consequence, the BSs within the interference area do not access the channel simultaneously, thereby preventing mutual interference. Because the BSs select contention numbers randomly, they can access the channel with probabilistic fairness.

In the '361 application, a UE's assistance is required for contention between BSs and a BS Bidding Channel (BBC)/ BS Indicator Channel (BIC) pair is needed to exchange contention information between a BS and a UE. Each BS notifies UEs of its contention number on a BBC and each UE notifies BSs of the result of a contention that they participated using a contention number on a BS Indicator Channel (BIC). While each BS should use an independent BBC/BIC pair to exchange contention information, the channels are not defined yet in LTE which is expected to be a dominant future-generation wireless communication system. Hence, how to apply the '361 application to the LTE system is to be discussed.

In this context, a method for adapting the technology disclosed in the '361 application to the LTE system, that is, a contention-based BS resource allocation method without defining a new channel in the LTE system, and a method for specifying the contention-based resource allocation method for BSs are provided in embodiments of the present invention. In addition, in the case where there are BSs or UEs not supporting the contention-based resource allocation scheme in the LTE system, the present invention provides a BS and a UE that operate in the contention-based resource allocation scheme (or contention mode) or an existing resource allocation scheme (or normal mode in which a channel is accessed without contention), adaptively according to a situation.

For this purpose, an embodiment of the present invention provides a contention-based scheduling scheme in which each adjacent BS transmits contention information on a Physical Broadcast Channel (PBCH) and upon receipt of the contention information, a UE broadcasts a contention number having a highest priority level among contention numbers as a tone signal in the LTE system.

Figure 2:
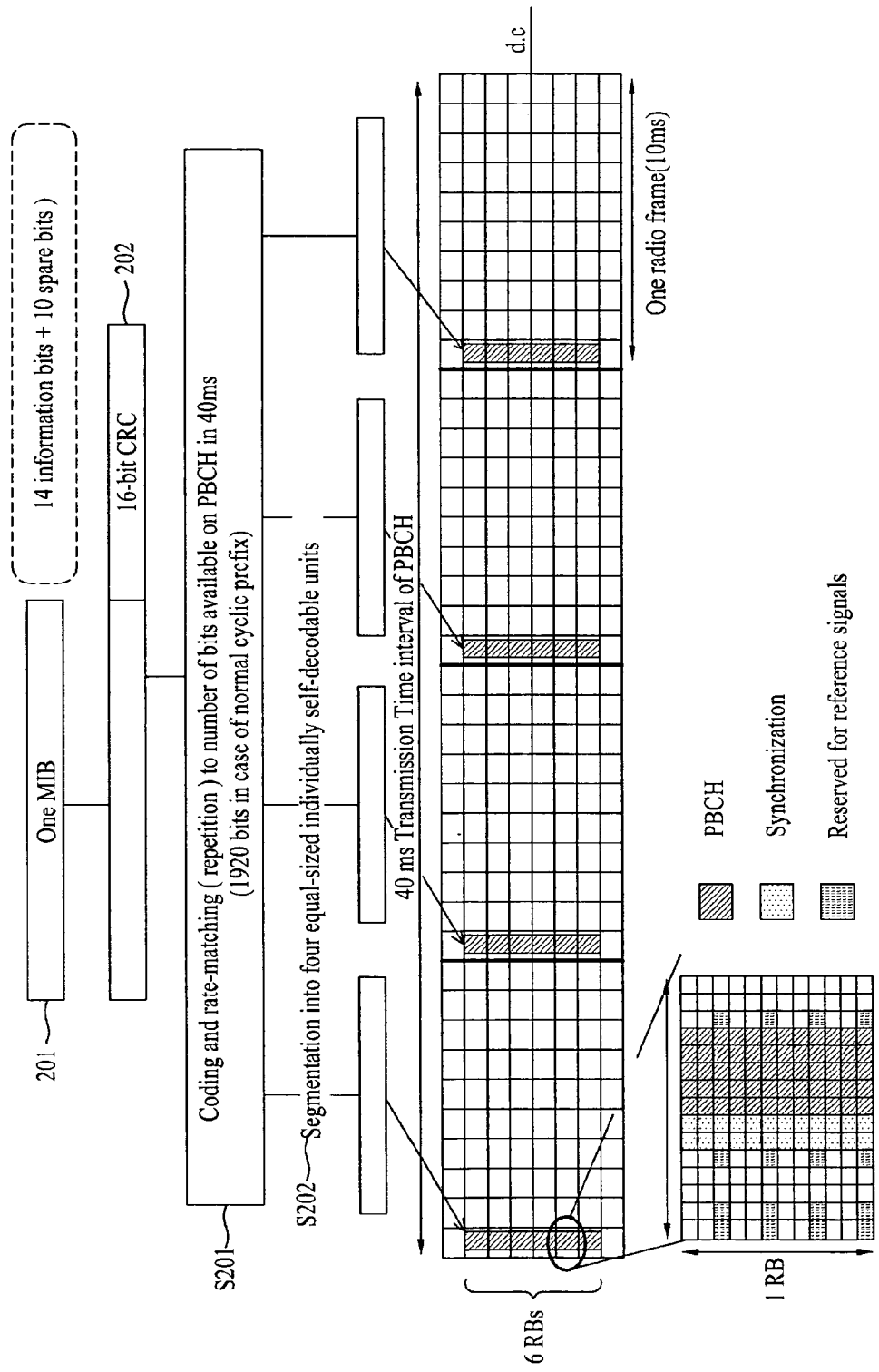
FIG. 2 illustrates an operation for transmitting contention information on a Physical Broadcast Channel (PBCH) that broadcasts a Master Information Block (MIB) in a $3^{rd}$ Generation Partnership Project (3GPP) Long Term Evolution (LTE) system as an example of mobile communication system according to an embodiment of the present invention.

FIG. 2 illustrates an operation for transmitting contention information on a PBCH that broadcasts a Master Information Block (MIB) in a 3GPP LTE system as an example of mobile communication system according to an embodiment of the present invention.

In the LTE system, system information may be divided into an MIB and one or more System Information Blocks (SIBs). The MIB carries essential and most frequently transmitted parameters that needed to acquire other information from a cell. The SIBS carry information other than the system information included in the MIB.

Referring to FIG. 2, one MIB 201 contains 24 bits. 14 bits out of the 24 bits carry information and the remaining 10 bits are spare. The 14 bits deliver downlink bandwidth information (3 bits), Physical HARQ Indicator Channel (PHICH) information (3 bits) and a System Frame Number (SFN) (8 bits). For more details, refer to 3GPP TS 36.331 V9.2.0.

In accordance with an embodiment of the present invention, contention information is transmitted in the 10 spare bits of the MIB 201, for use in contention-based scheduling. A specific format of contention information will be described later. The 24-bit MIB may be attached with a 16-bit Cyclic Redundancy Check (CRC) 202, prior to transmission.

The CRC-attached MIB is channel-encoded and rate-matched (S201). Thus, the CRC-attached MIB is matched to the number of bits suitable for transmission on a 40-ms PBCH. If a normal Cyclic Prefix (CP) is used in the LTE system, the channel-encoded and rate-matched MIB is 1920 bits long.

After the channel coding and rate matching in step S201, the MIB is equally segmented into four units for transmission during the 40-ms Transmission Time Interval (TTI) of the PBCH (S202). Each of the four MIB segments is transmitted in four Orthogonal Frequency Division Multiplexing (OFDM) symbols following OFDM symbols carrying synchronization channels, that is, a Primary Synchronization Channel (P-SCH) and a secondary Synchronization Channel (S-SCH).

Now a detailed description will be given of contention information transmitted on the PBCH.

Figure 3:
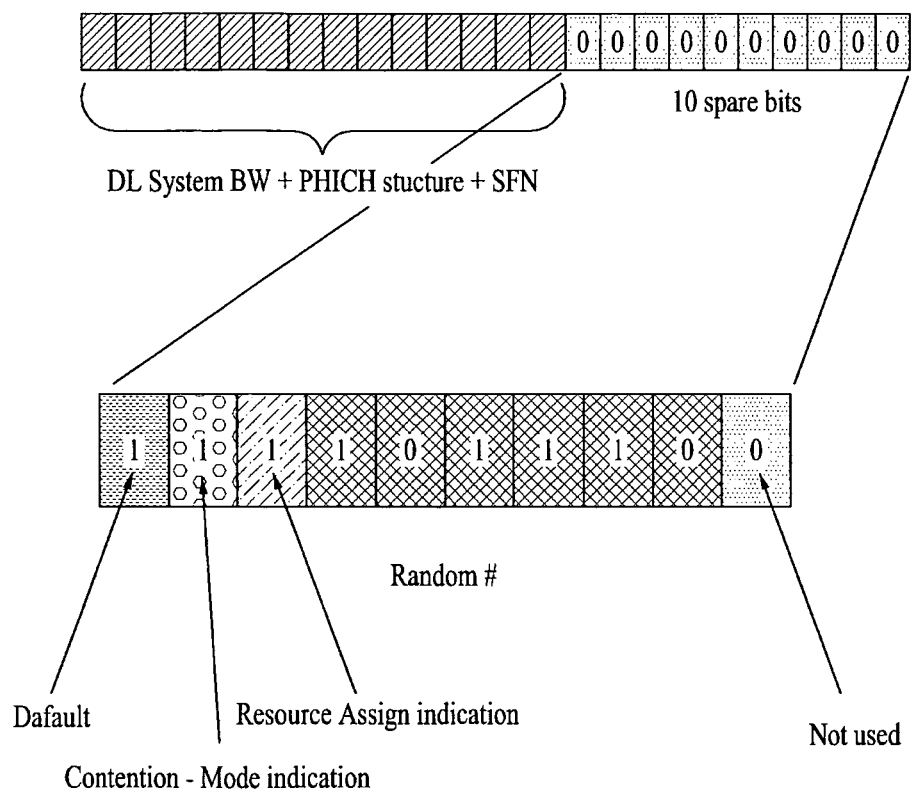
FIG. 3 illustrates an exemplary structure of an MIB according to an embodiment of the present invention.

FIG. 3 illustrates an exemplary structure of an MIB according to an embodiment of the present invention.

Referring to FIG. 3, an MIB delivers downlink system bandwidth information and PHICH transmission structure information in 14 bits. According to an embodiment of the present invention, 10 spare bits of the MIB are used for transmitting contention information as follows.

(1) 1 bits out of the 10 spare MIB bits is a default bit indicating whether a BS supports contention mode. If the default bit is set to '1', this indicates that the BS supports the contention mode. For a legacy BS not supporting the contention mode, the default bit is set to '0'. A UE can determine the presence or absence of a legacy BS within a coverage area, from the default bit.

(2) The next 1 bit out of the 10 spare MIB bits is a contention mode indication bit (a CM-indication bit) indicating whether the BS is currently operating in the contention mode.

(3) The third bit of the 10 spare MIB bits is a Resource Assign indication bit (an RA-indication) bit indicating whether the BS uses a channel in a current stage, stage n frame n) according to a contention result for a previous frame.

When needed, the default bit may be omitted. In this case, the UE may consider only whether adjacent BSs are operating in the contention mode or normal mode. The UE may regard a BS that is not operating in the contention mode as a legacy BS.

Meanwhile, a BS may directly transmit a random contention number for the next stage, stage (n+1) (e.g. frame (n+1)) in the remaining 7 or fewer bits as illustrated in FIG. 3. Aside from a method for transmitting a contention number using all of the 10 spare MIB bits in the LTE system, the following method is provided in accordance with an embodiment of the present invention.

Figure 4:
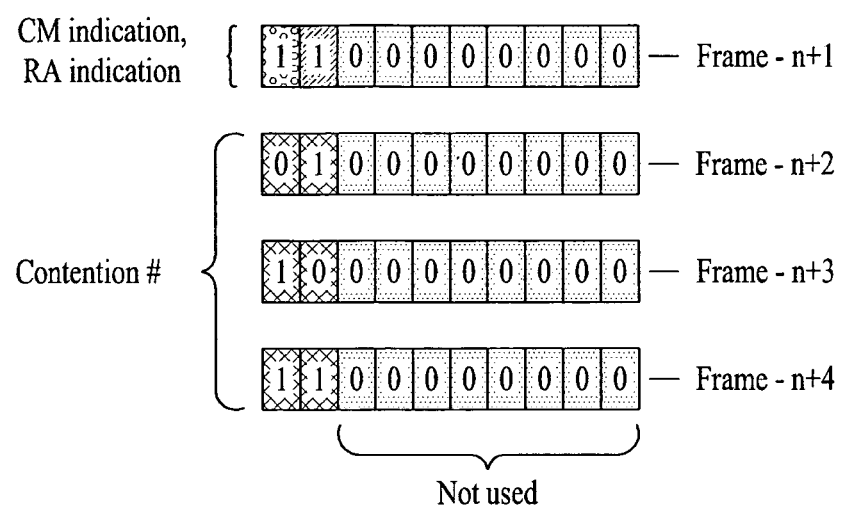
FIG. 4 illustrates a method for transmitting contention number information separately in a plurality of MIBs according to an embodiment of the present invention.

FIG. 4 illustrates a method for transmitting contention number information separately in a plurality of MIBs according to an embodiment of the present invention.

In this embodiment, only 2 bits out of the 10 spare MIB bits are used for a BS to transmit contention information for downlink signal transmission. More specifically, 2 bits of a first MIB carry a CM-indication and an RA-indication and 2 bits of each of a plurality of next MIBs carry a part of the contention number. In an example illustrated in FIG. 4, a contention number '011011' is transmitted separately in three MIBs.

Figure 5:
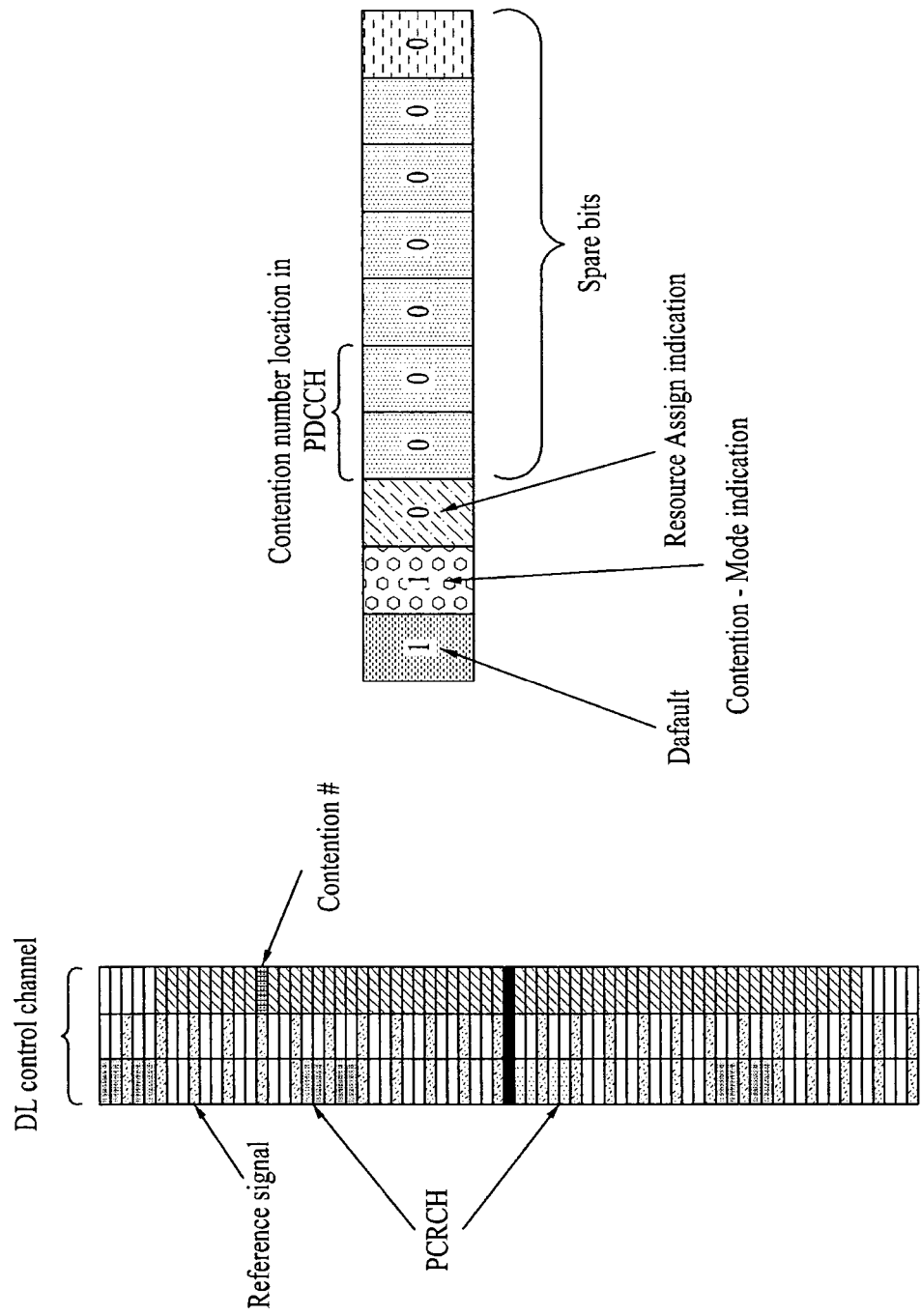
FIG. 5 illustrates a method for transmitting contention number information on a Physical Downlink Control Channel (PDCCH) according to an embodiment of the present invention.

FIG. 5 illustrates a method for transmitting contention number information on a Physical Downlink Control Channel (PDCCH) according to an embodiment of the present invention.

Referring to FIG. 5, information about the position of contention number information in a PDCCH is transmitted in a part of the MIB bits and a contention number is transmitted at the position in the PDCCH, indicated by the MIB. The contention number information may be transmitted as a tone signal on predetermined subcarriers of the PDCCH. Specifically, downlink control information may be transmitted in up to three OFDM symbols in a slot in the LTE system. In the OFDM symbols, the PDCCH may be transmitted in resource elements that do not have a reference signal for channel measurement, a Physical Control Format Indicator Channel (PCFICH) specifying the size of a downlink control period, and a PHICH. In an embodiment of the present invention, the tone signal carrying the contention number information is transmitted in a third symbol to which reference symbols of the PDCCH are not mapped. In the illustrated case of FIG. 5, 3 bits out of the 10 spare MIB bits are used as a default bit, a CM-indication, and an RA-indication. However, the default bit may be omitted as described before. In addition, the number of bits indicating information about the position of a contention number in the PDCCH is not restricted.

Meanwhile, in another embodiment of the present invention, a seed value from which a contention number can be derived using a function preset between a BS and a UE is transmitted, rather than the contention number itself is transmitted.

Upon receipt of contention information from each adjacent BS, a UE operates as follows.

Upon receipt of broadcast contention information from every adjacent BS, the UE may broadcast contention information using a tone signal. Specifically, the UE may acquire Physical Cell IDs (PCIs) of adjacent BSs during a cell search and receive PBCHs carrying contention information from the adjacent BSs based on the PCIs. A method for receiving PBCHs from adjacent BSs may be different depending on the afore-described content information transmission schemes. For example, if BSs transmit contention numbers on PBCHs, a UE may extract the contention numbers from the received PBCHs. On the other hand, if each of the BSs transmits information about the position of a contention number in a PDCCH on a PBCH, the UE may receive contention number information at the position in the PDCCH, indicated by the PBCH.

The UE may broadcast a contention number with the highest priority level among the received contention numbers to the adjacent BSs.

It can be said that the contention-based distributed BS scheduling scheme according to the present invention is performed with indirect cooperation between BSs based on contention through UEs. Among BSs supporting the contention mode, a BS that has won a contention uses a channel during one stage (a resource unit allocated according to a contention result) and BSs that have lost the contention give up the channel during the stage. If there are BSs that do not support the contention mode around the contention winner, the connection winner may suffer from low performance due to a low Signal-to-Interference and Noise Ratio (SINR) despite using the channel according to the contention result. Moreover, since the content losers give up the channel according to the contention result, they have fewer opportunities to use a channel. Thus the capacities of the BSs may be lower in the contention mode than in the normal mode in which they always use channels. That is, when content-mode BSs coexist with legacy BSs (or normal-mode BSs), the contention-mode BSs suffer losses all the time.

On the other hand, if BSs supporting the contention mode always operate in the normal mode whenever legacy BSs exist around them, most of BSs operate in the normal mode, thereby making it impossible to derive cooperation between BSs. Accordingly, the BSs supporting the contention mode should make a choice between the contention mode and the normal according to an appropriate criterion.

Therefore, a UE transmits information indicating the presence or absence of a BS not supporting contention-based scheduling or a BS operating in a non-contention mode in a broadcast signal, so that a BS may determine whether to operate in a contention-based scheduling mode according to an embodiment of the present invention. If the number of BSs operating in the non-contention mode is equal to or larger than a predetermined threshold, BSs operating in the contention mode may transition to the normal mode. However, a criterion for transitioning to the contention mode/normal mode is not limited to any specific one in the present invention. That is, BSs supporting the contention mode may select the contention mode or the normal mode adaptively because they are aware of the presence or absence of BSs operating in a non-contention mode (or BSs not supporting the contention mode) around them.

Figure 6:
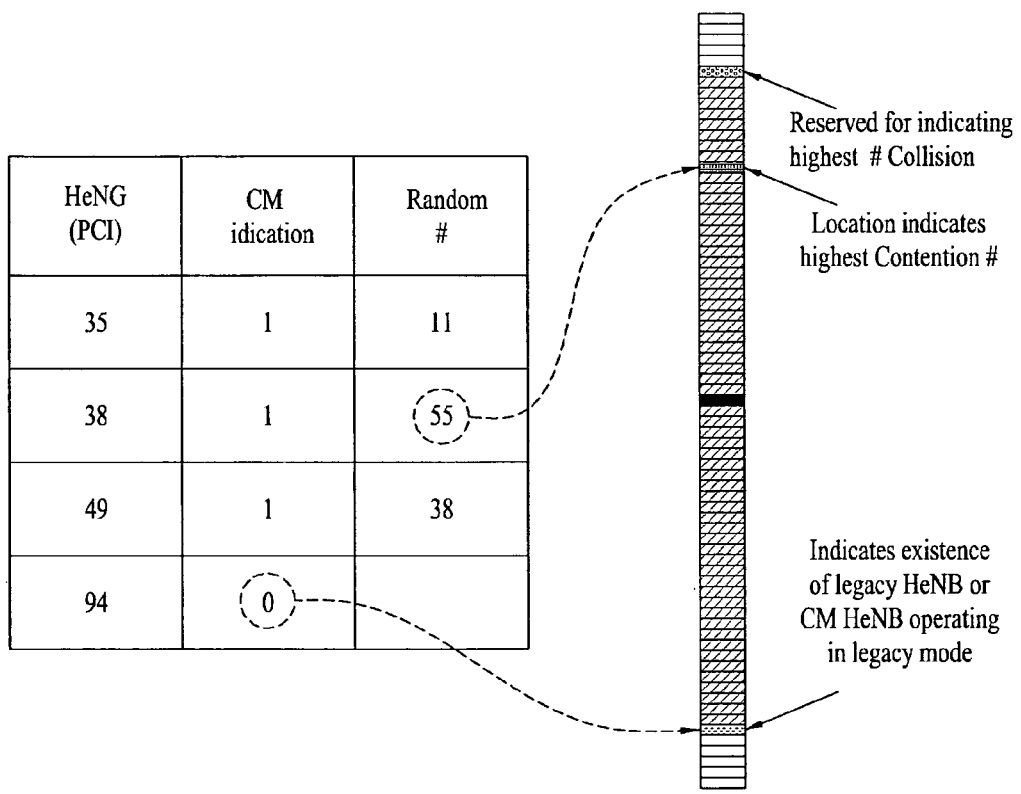
FIG. 6 illustrates a broadcast signal that a UE transmits to adjacent BSs according to an embodiment of the present invention.

FIG. 6 illustrates a broadcast signal that a UE transmits to adjacent BSs according to an embodiment of the present invention.

As noted from the left part of FIG. 6, the UE may acquire the PCIs of adjacent BSs and then acquire CM indications indicating whether the adjacent BSs are operating in the contention mode and information about contention numbers of the adjacent BSs from PBCHs received from the adjacent BSs. In this embodiment, it is assumed that the adjacent BSs are femtocell BSs (HeNBs) and a BS having the highest of the contention numbers wins a downlink transmission contention for the next stage.

In the example of FIG. 6, BSs with cell IDs 35, 38, 49 and 94 exist within coverage. A BS having cell ID 94 is not operating in the contention mode and a BS having cell ID 38 transmits a contention number having the highest priority level.

In this case, the UE broadcasts the contention number with the highest priority level as a tone signal in the embodiment of the present invention, as illustrated in FIG. 6. If a plurality of BSs transmitted a contention number with the highest priority level, it is preferred that the UE additionally broadcasts information indicating the existence of a plurality of BSs having the highest-priority contention number.

Upon receipt of the contention number with the highest priority level from the UE, adjacent BSs that transmitted contention numbers with priority levels lower than the highest-priority contention number may give up their downlink signal transmissions during a predetermined stage, determining that they have lost the contention. Meanwhile, a BS that transmitted the highest-priority contention number (i.e. the BS with cell ID 38) may transmit a downlink signal in the stage, considering that it has won the contention. If a plurality of BSs transmitted the highest-priority contention number, a BS to transmit a downlink signal may be selected based on an additional criterion (e.g. the number of frames in which the BS has given up its downlink signal transmission).

In an embodiment of the present invention, information indicating the presence or absence of a BS that is not operating in the contention mode is included in tone information. In the example of FIG. 6, the BS with cell ID 94 is not operating in the contention mode and thus the UE may transmit information indicating the existence of a BS not operating in the contention mode in a tone signal. A BS may select the contention mode or the normal mode, taking into account this information.

Transmission of the tone information from the UE does not need to be confined to a specific uplink channel. Any channel that all of the adjacent BSs can detect without special resource allocation suffices. In this aspect, a Physical Random Access Channel (PRACH) is suitable for transmission of the tone information.

Let the number of adjacent BSs be denoted by L, the distance between a $k^{th}$ adjacent BS and the UE be denoted by d, a path loss index be denoted by a, an antenna gain be denoted by A, and a threshold power with which the tone signal is detected be denoted by $P_{th}$.

Then, the transmission power of a tone signal for the $k^{th}$ adjacent BS is computed by $$P_k = \frac{d^a}{A} P_{th} \qquad \text{[Equation 1]}$$

where k=0, 1, . . . , L−1. The transmission power of the tone signal may be determined by $$P_{tone} = \max\{P_1, P_2, \ldots P_k, P_L\} \qquad \text{[Equation 2]}$$

[Equation 2] means that the UE broadcasts the contention information with minimum power that allows all adjacent BSs can receive the contention information from the UE.

In an embodiment of the present invention, a UE broadcasts a tone signal carrying contention information a plurality of times repeatedly.

Figure 7:
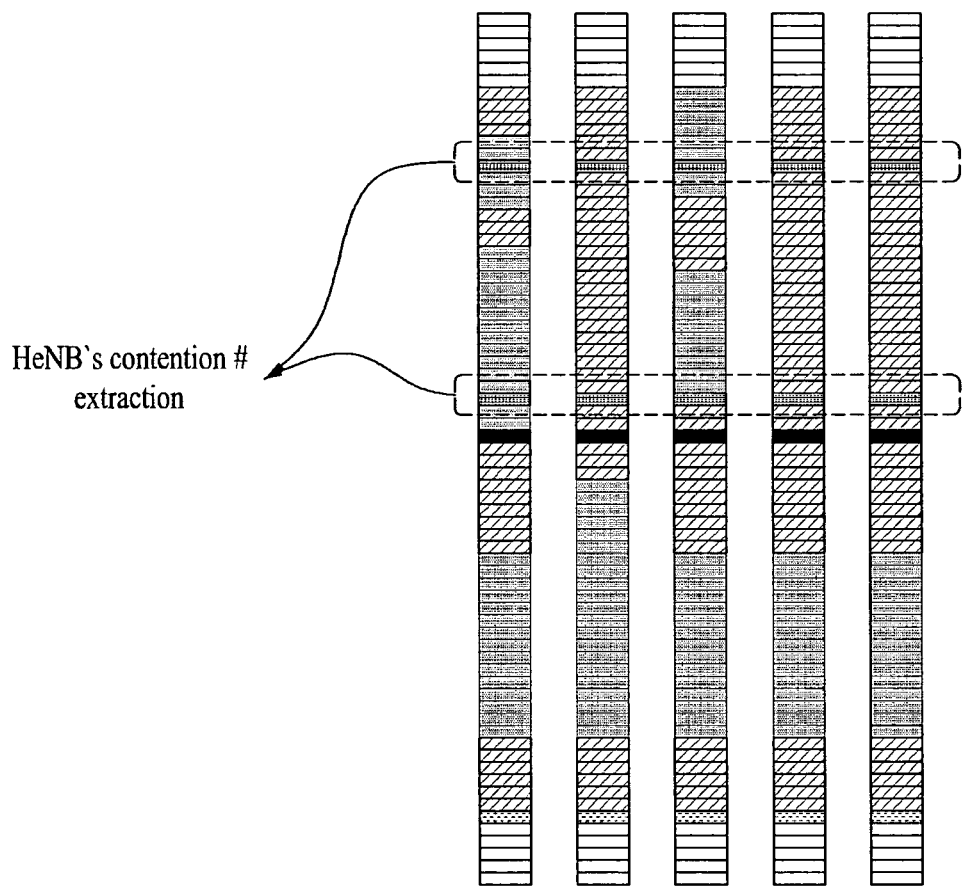
FIG. 7 illustrates a method for transmitting contention information a plurality of times repeatedly at a UE according to an embodiment of the present invention.

FIG. 7 illustrates a method for transmitting contention information a plurality of times repeatedly at a UE according to an embodiment of the present invention.

Referring to FIG. 7, while the tone signal illustrated in FIG. 6 is transmitted four times repeatedly, the number of repetition occurrences is not limited to a specific number. In accordance with this embodiment, as far as the UE transmits the same tone signal k times and adjacent BSs receive the same information k times, contention information included in the tone signal may be considered reliable. For instance, in the case where the UE is set to transmit contention information four times repeatedly, if a BS fails to receive the same tone signal four times, the BS may neglect the received tone signal, determining it to be an interference signal from a UE that does not support the contention mode. In addition, depending on a system situation, even though the number of receptions of the same signal at a BS is not equal to the number of repeated transmissions from the UE, for instance, only if the BS receives the same signal three or more times, the BS may determine the received signal to be contention information.

During the above operation, if an RA-indication bit of a serving BS is 1, the UE may interpret a PDCCH and receive downlink data on a Physical Downlink Shared Channel (PDSCH) or transmit uplink data on a Physical Uplink Shared Channel (PUSCH) or Physical Uplink Control Channel (PUCCH), in a current stage. On the other hand, if the RA-indication bit is 0, the UE neither listens to a downlink channel nor accesses an uplink channel.

The above-described operation of the present invention will be described below from the viewpoint of a downlink/uplink time domain.

Figure 8:
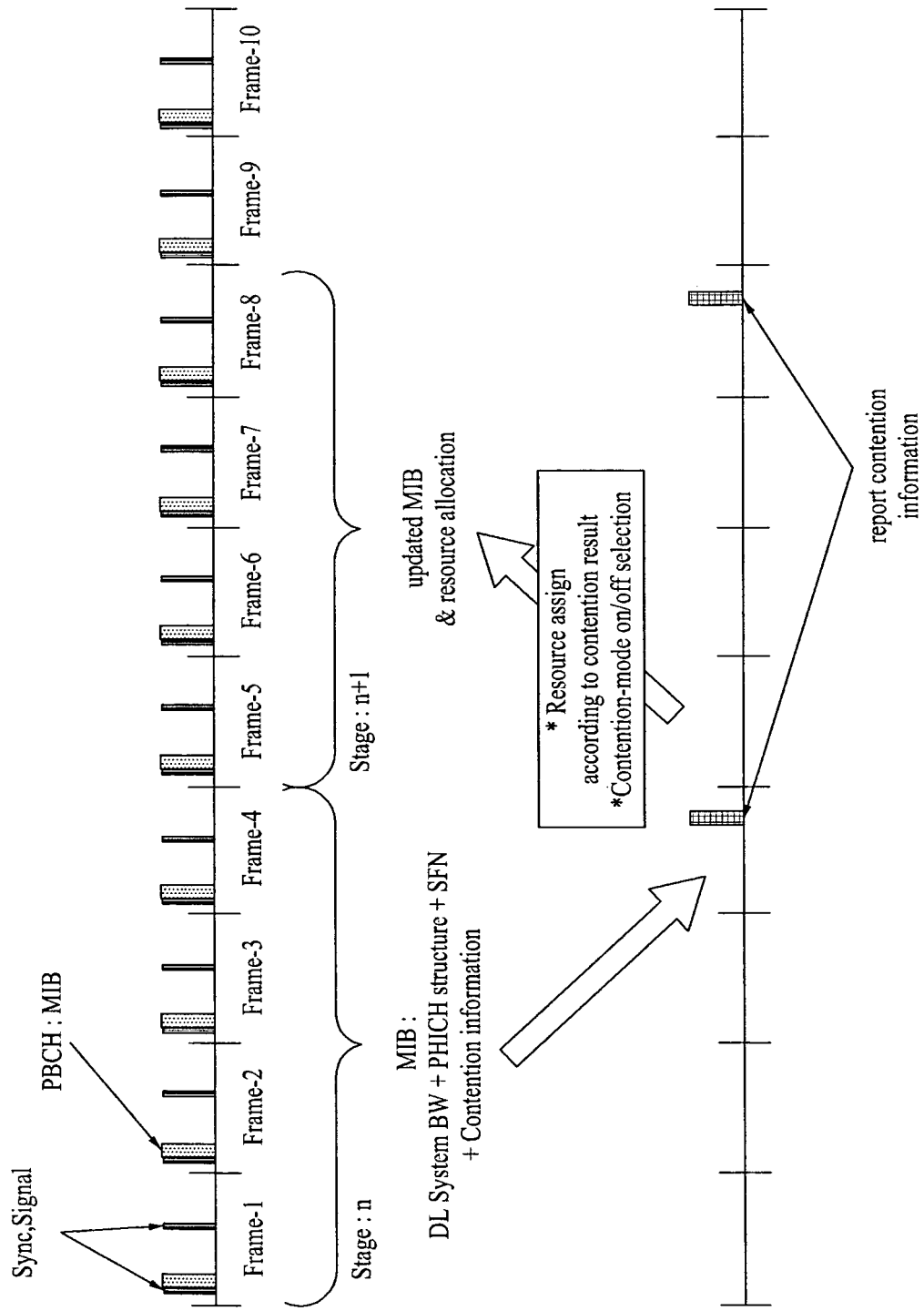
FIG. 8 illustrates a contention-based downlink scheduling method according to an embodiment of the present invention.

FIG. 8 illustrates a contention-based downlink scheduling method according to an embodiment of the present invention.

In this embodiment, one stage includes four frames, Frame-1 to Frame-4. Adjacent BSs may transmit contention information on PBCHs to a specific UE in Frame-1 to Frame-4. Preferably, a BS transmits its contention information in an MIB that carries downlink bandwidth information, PHICH configuration information, and an SFN. Upon receipt of the contention information from the adjacent BSs, the UE may broadcast information about a contention number with the highest priority level and information about a BS operating in the legacy mode.

The adjacent BSs may allocate resources for the next stage, that is, Frame-5 to Frame-8 based on the broadcast information received from the UE. In addition, the adjacent BSs may determine whether to operate in the contention mode or the normal mode in the next stage, based on the presence or absence of a legacy-mode BS as indicated by the UE. Specifically, each BS may select the contention mode or the normal mode adaptively according to its capacity and its perceived surroundings and then may operate in the selected mode.

Configuring one stage with four frames in FIG. 8 is purely exemplary. Thus the number of frames or subframes per stage may be set freely. Further, while Frequency Division Duplex (FDD) is shown as an operation scheme in FIG. 8, the same thing is applicable to Time Division Duplex (TDD). While the UE transmits contention information once herein, it may transmit the contention information a plurality of times repeatedly in order to increase reliability.

Figure 9:
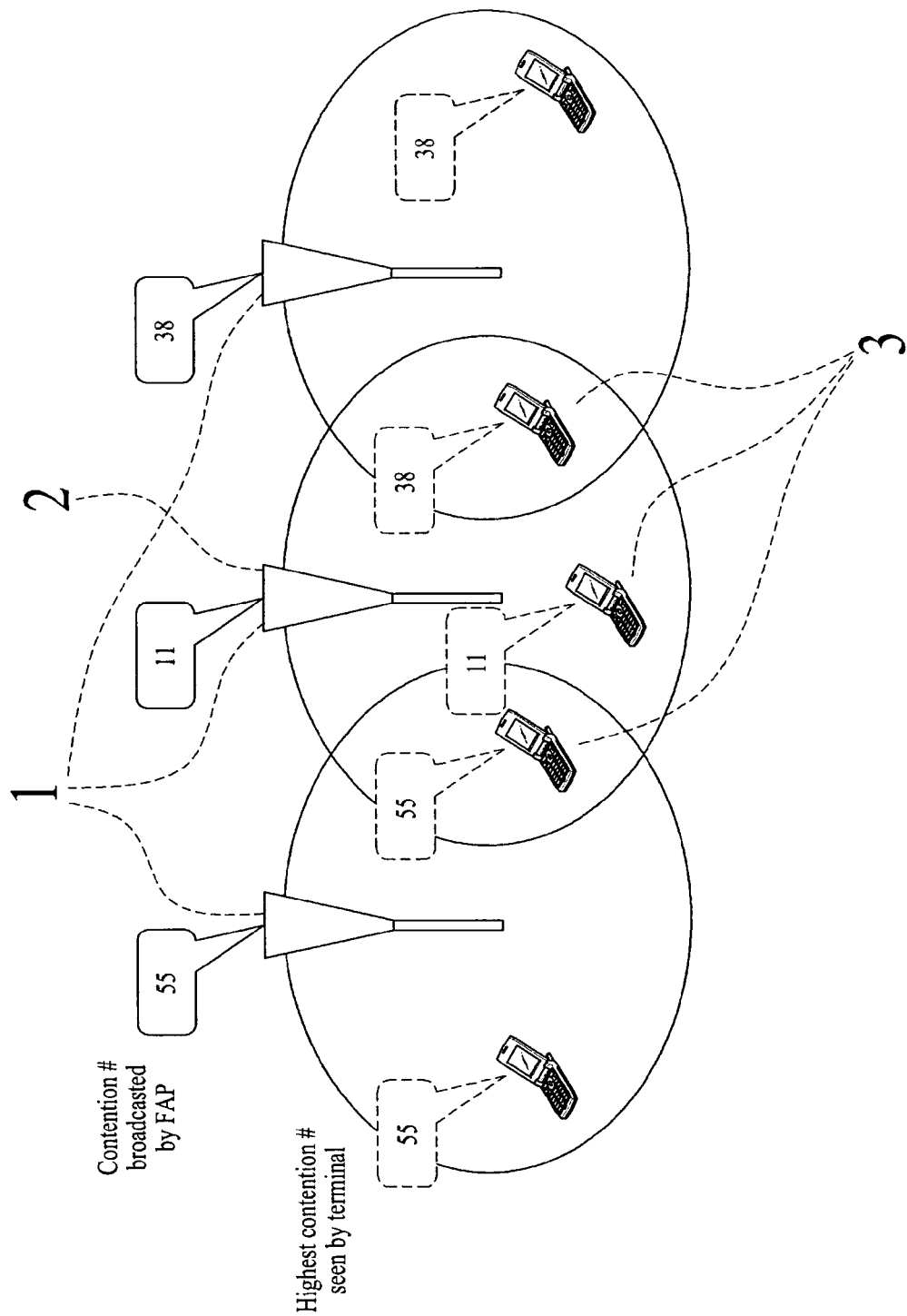
FIGS. 9 and 10 illustrate operations of a Base Station (BS) and a User Equipment (UE) according to an embodiment of the present invention.
Figure 10:
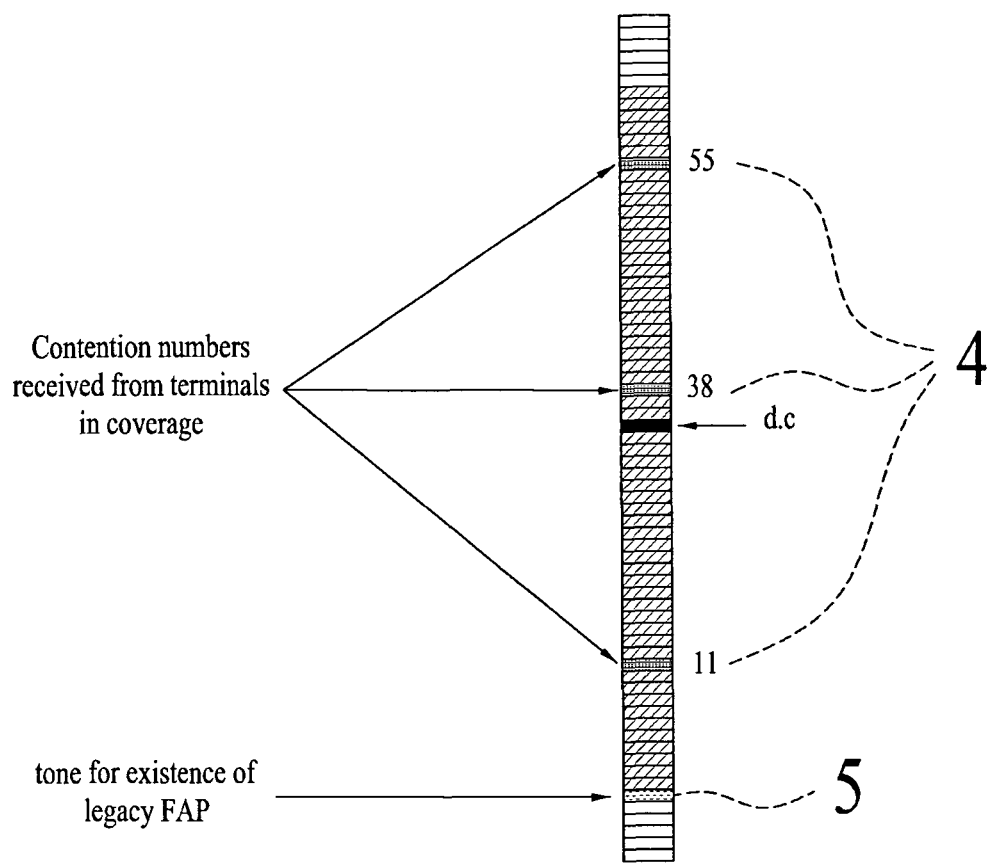

FIGS. 9 and 10 illustrate operations of a BS and a UE according to an embodiment of the present invention.

FIG. 9 illustrates a contention method between BSs and between UEs according to an embodiment of the present invention. Each BS1 may select a contention number randomly and broadcast the contention number. For instance, BSs 1 may broadcast contention numbers 55, 11 and 38, respectively.

Each UE listens to contention numbers broadcast from all adjacent BSs and broadcasts a contention number with the highest priority level. For instance, UEs may broadcast 55, 55, 11, 38 and 38, respectively as contention numbers with the highest priority levels.

If a BS2 in the middles of BSs listens to a contention number with a higher priority level than the contention number transmitted by it, it determines that it has lost the contention. How information broadcast by each UE reaches the middle BS2 is illustrated in FIG. 10. Referring to FIG. 10, UEs broadcast the highest-priority contention numbers among contention numbers that they have listened to, as tone signals on predetermined positions along the frequency axis. If there are adjacent BSs operating in the legacy mode around the UEs, the UEs broadcast tone signals at predetermined positions along the frequency axis. Each BS may then determine whether to transmit a downlink signal in a next stage and select the contention mode or the normal mode.

FIGS. 11 to 14 illustrate results of simulations for verifying the accuracy of the contention-based scheduling scheme according to the present invention.

Figure 11:
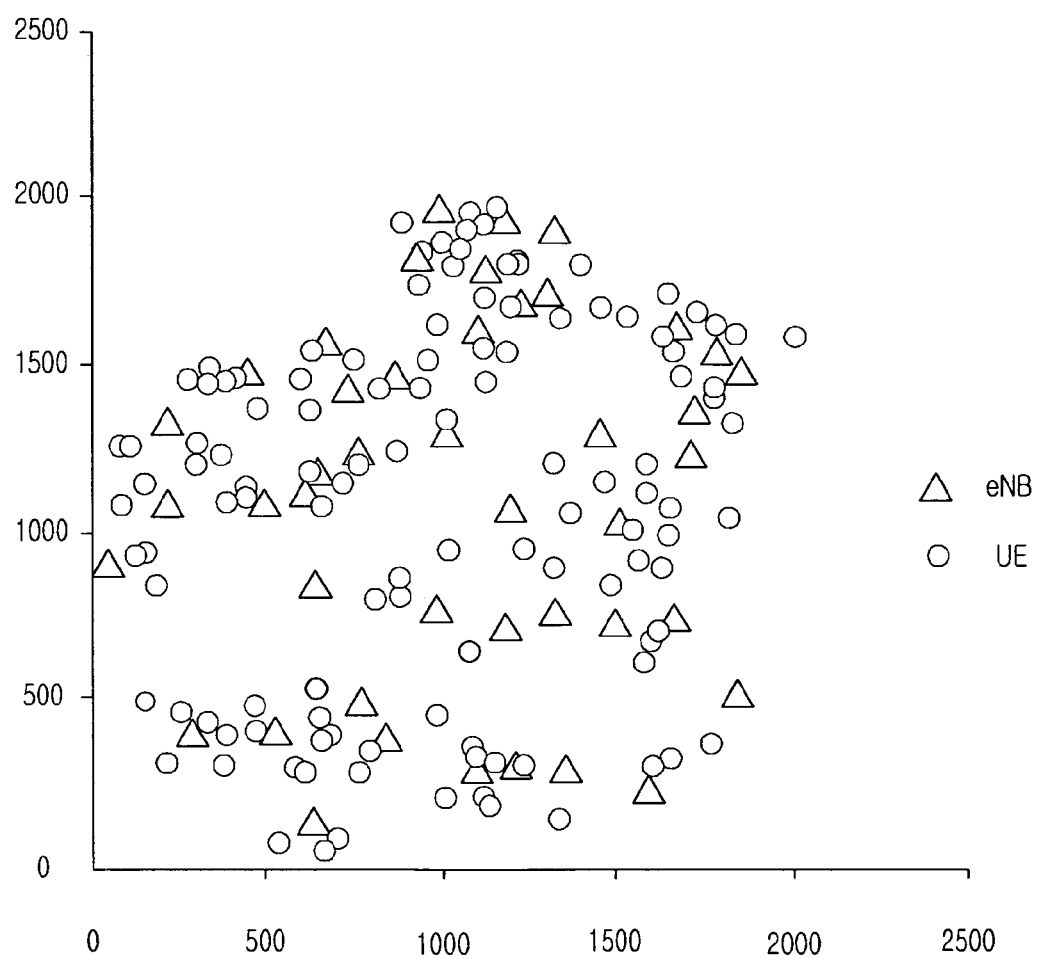
FIGS. 11 to 14 illustrate results of simulations for verifying the accuracy of the contention-based scheduling scheme according to the present invention.

FIG. 11 illustrates a situation of a wireless communication system in which there are 50 BSs each having 1 to 4 UEs, as an assumption for simulations. In FIG. 11, the horizontal and vertical axes represent distances in meters.

Figure 12:
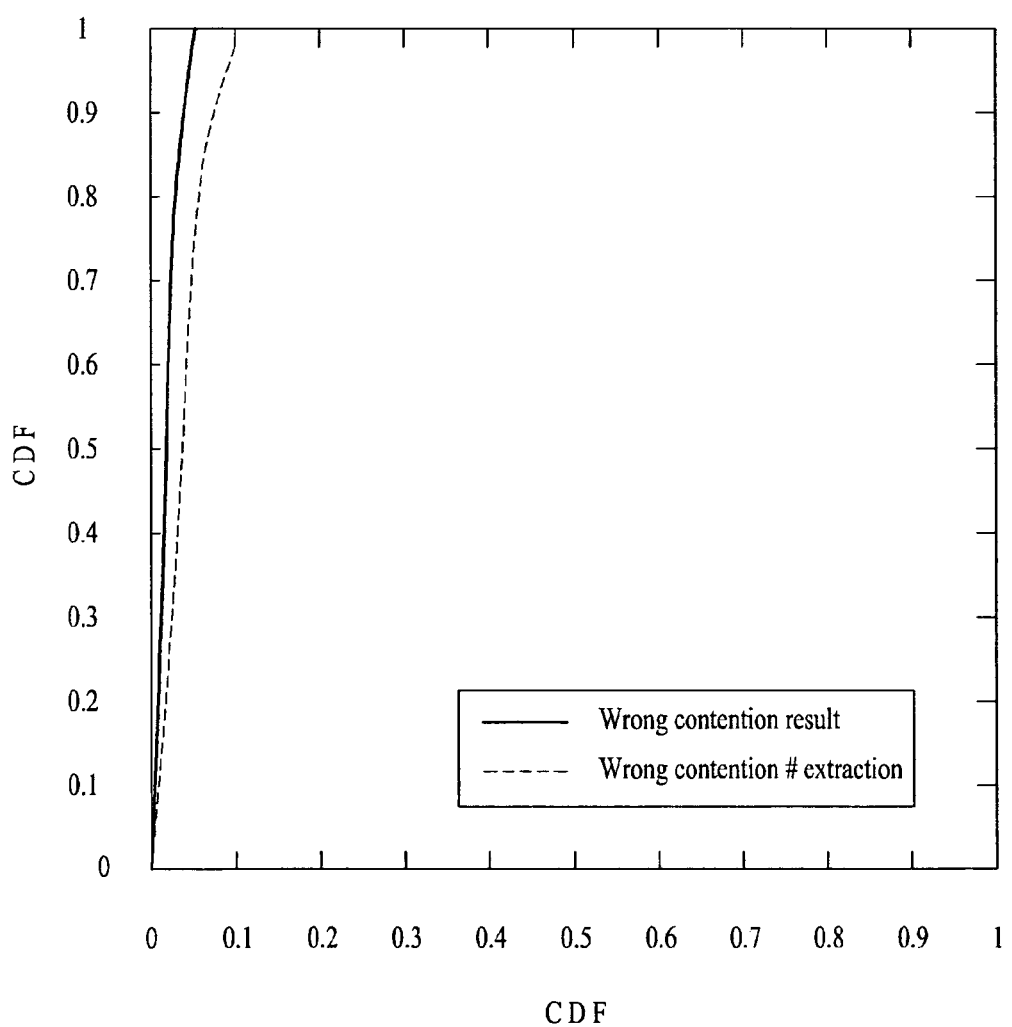

FIG. 12 is a graph illustrating a relative frequency of wrong extractions of highest-priority contention numbers broadcast by UEs at each BS (presented as a Core Damage Frequency (CDF) and a relative frequency of wrong contention results as a consequence of the wrong contention number extractions, when all BSs and UEs support the contention mode in the simulation environment of FIG. 11. A wrong contention result refers to a wrong determination that a BS makes by determining that it has won a contention it has lost or vice versa.

Even though a BS extracts wrong highest contention numbers transmitted by UEs, contention results may be still the same. For instance, even though a BS extracts a wrong highest contention number, the extracted contention number may be higher than a contention number transmitted by the BS. Therefore, the relative frequency of wrong contention results is lower than the relative frequency of wrong contention number extractions.

Figure 13:
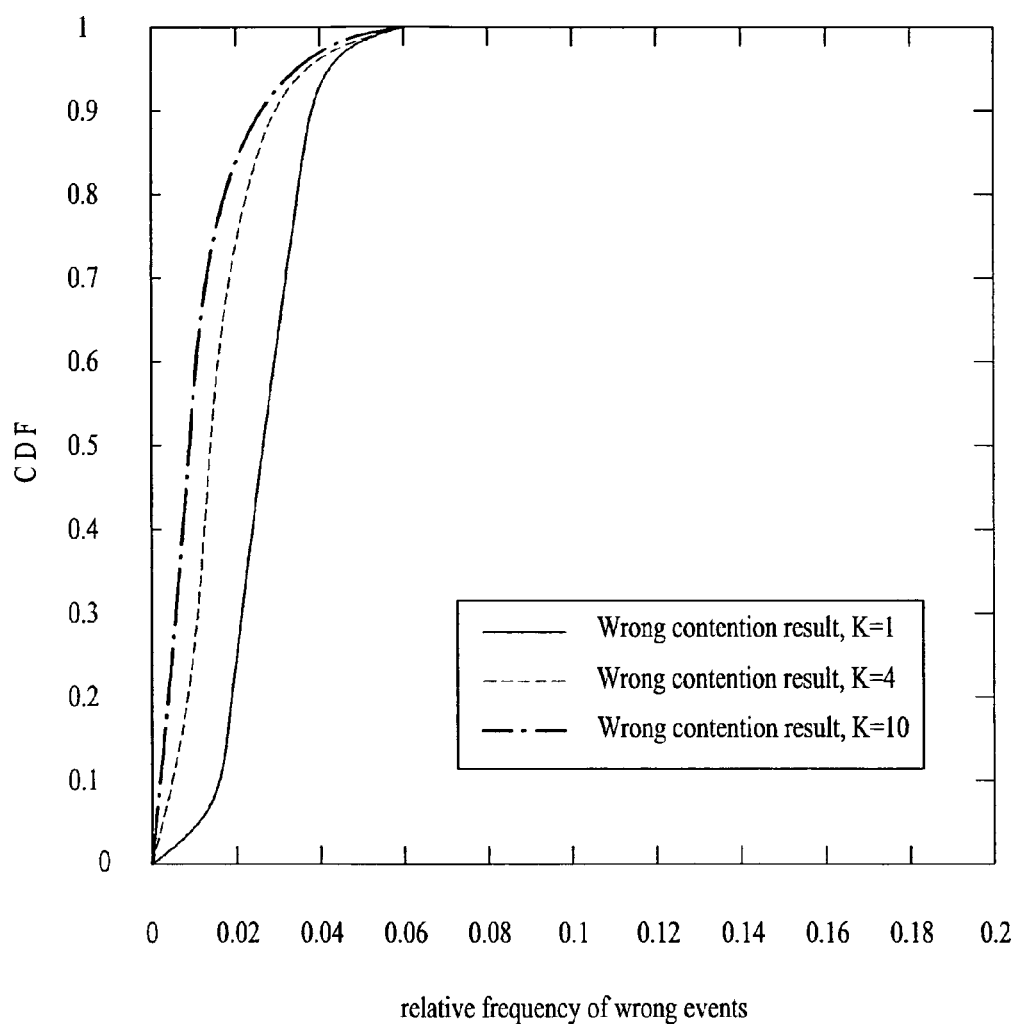

FIG. 13 is a graph illustrating the relative frequencies of wrong contention results for each BS, when 20% of BSs and 20% of UEs do not support the contention mode in the simulation environment illustrated in FIG. 11. It is assumed that the uplink traffic generation probability of a UE that does not support the contention mode is 0.5. K denotes the number of repeated transmissions of a tone signal from a UE. If K=1, a UE broadcasts a highest contention number once. If K=4, the UE broadcasts a highest contention number four times. If K=10, the UE broadcasts a highest contention number ten times. When the number of repeated transmissions of a tone signal from a UE increases from 1 to 4, performance increases. However, when the number of repeated transmissions of a tone signal from a UE increases from 4 to 10, performance is not improved much.

Figure 14:
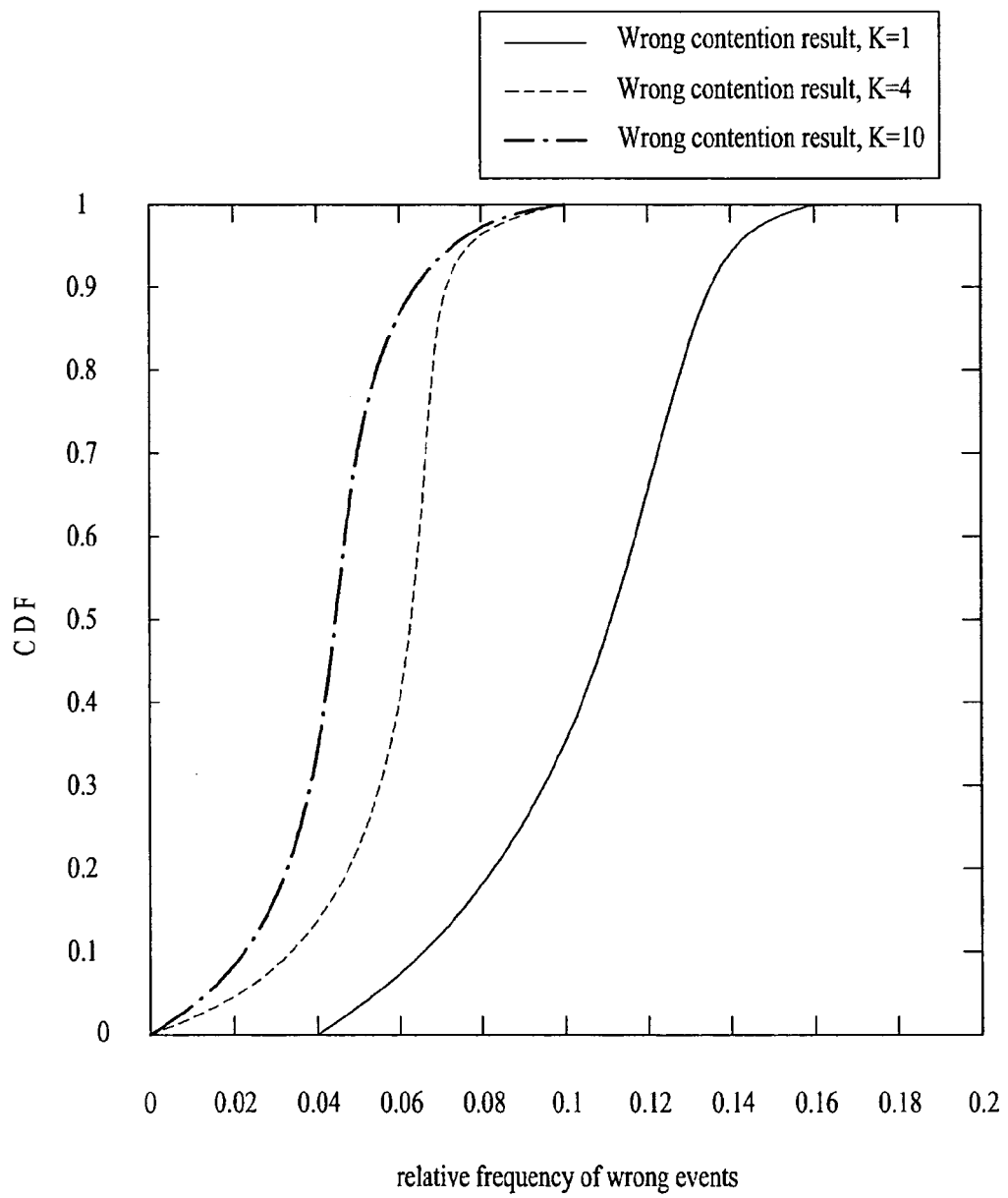

FIG. 14 is a graph illustrating the relative frequencies of wrong contention results for each BS, when 50% of BSs and 50% of UEs do not support the contention mode in the simulation environment illustrated in FIG. 11. It is assumed that the uplink traffic generation probability of a UE that does not support the contention mode is 0.5. K denotes the number of repeated transmissions of a tone signal from a UE. When the number of repeated transmissions of a tone signal from a UE increases from 4 to 10, performance increases. Thus, it is preferred to determine the number of repeated transmissions of a tone signal from a UE, taking into account a system situation such as a ratio of BSs/UEs not supporting the contention mode.

The configurations of a UE and a BS for implementing the above-described embodiments of the present invention will be described below.

Figure 15:
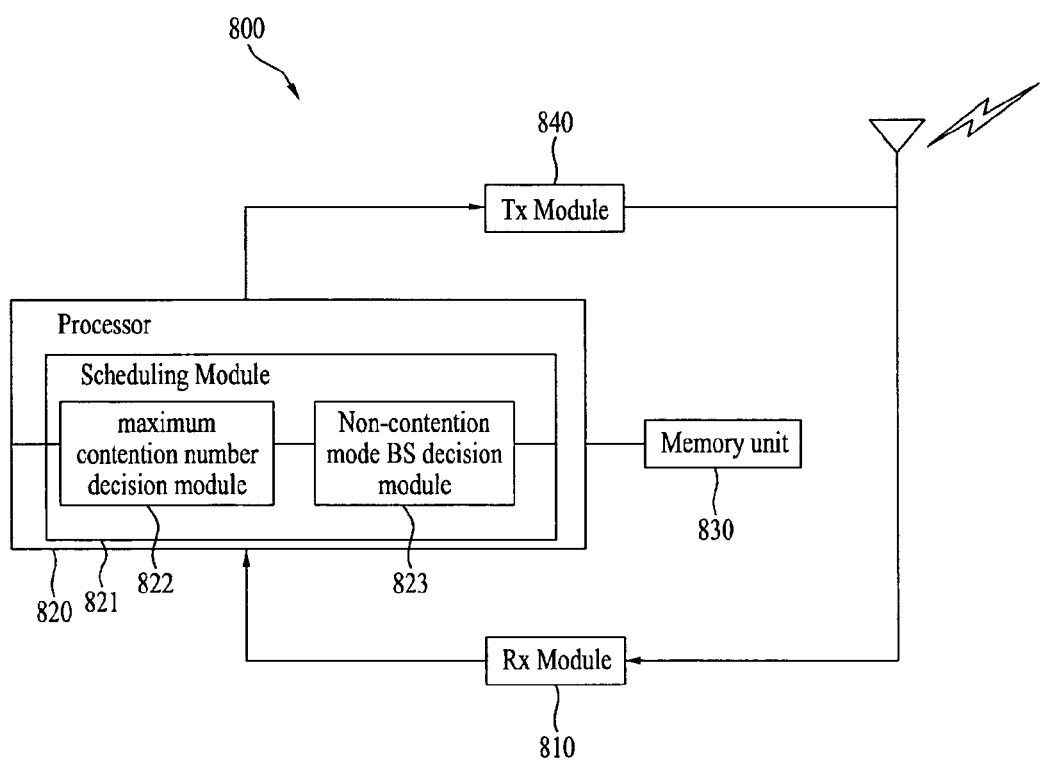
FIG. 15 is a block diagram of an embodiment of a UE apparatus for performing scheduling according to the embodiments of the present invention.

FIG. 15 is a block diagram of an embodiment of a UE apparatus for performing scheduling according to the embodiments of the present invention.

Referring to FIG. 15, the UE apparatus may include a Reception (Rx) module 810, a processor 820, a memory unit 830, and a Transmission (Tx) module 840.

The Rx module 810 may receive all downlink signals from a BS. Especially, the Rx module 810 may receive a PBCH from each adjacent BS according to each of the afore-described embodiments of the present invention. If contention number information is transmitted on a PDCCH, the Rx module 810 may receive the contention number information on the PDCCH based on information about a contention number location in the PDCCH, received on a PBCH.

The processor 820 may include a scheduling module 821. The processor 820 may further include a maximum contention number decision module 822 for determining a maximum contention number based on contention information received from adjacent BSs and a non-contention mode BS decision module 823 for determining the existence or absence of a BS not operating in the contention mode.

The memory unit 830 may store information such as random number information received from BSs for a predetermined time.

The Tx module 840 may broadcast a tone signal carrying maximum contention number information and information indicating the presence or absence of a BS not operating in the contention mode according to a decision made by the processor 820. If it is regulated that the same tone signal is transmitted K times, the Tx module 840 transmits the tone signal K times repeatedly.

Figure 16:
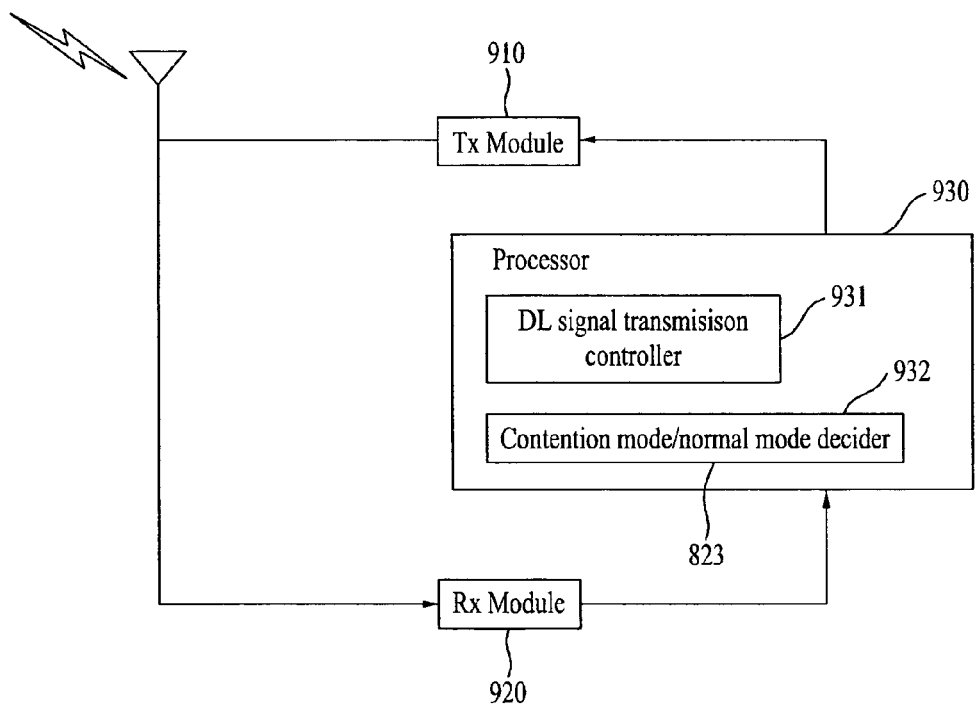
FIG. 16 is a block diagram of an embodiment of a BS apparatus for transmitting a downlink signal according to each of the embodiments of the present invention.

FIG. 16 is a block diagram of an embodiment of a BS apparatus for transmitting a downlink signal according to each of the above-described embodiments of the present invention.

Referring to FIG. 16, the BS apparatus may include a Tx module 910, an Rx module 920, and a processor 930.

The Rx module 920 may receive maximum contention number information broadcast by a UE and a tone signal indicating the presence or absence of a BS not operating in the contention mode. The processor 930 determines whether to transmit a downlink signal in a next stage at a DL signal transmission controller 931 and selects the contention mode or the normal mode at a contention/normal mode decider 932.

If the BS is supposed to transmit a downlink signal in the next stage, the Tx module 910 may transmit a downlink signal on a PDCCH or PDSCH to the UE.

The contention-based distributed BS time scheduling scheme according to the present invention effectively controls interference in a distributed manner by distributing time resources effectively in a situation where BSs are densely distributed. Therefore, the overall capacity of a network can be increased. In addition, since only channels defined for the LTE system are used, overhead that might otherwise be caused by defining an additional channel can be reduced. Furthermore, a BS is allowed to select a contention mode or a normal mode adaptively according to a system situation. Accordingly, an additional performance increase can be achieved.

Now a description will be given of a method for ensuring short-term fairness as well as long-term fairness in a system that reduces inter-BS interference through time scheduling according to another embodiment of the present invention.

Basically, adjacent BSs transmit signals to and receive signals from a UE in the contention-based scheduling scheme disclosed in the '361 application. However, compared to the '361 application that uses BBC/BIC pairs, the adjacent BSs may transmit contention information to the UE in spare MIB bits of a PBCH defined in the 3GPP LTE system and the UE may broadcast a tone signal indicating a BS that has won a contention for the next stage, on an uplink channel accessible to all adjacent BSs, for example, an RACH.

The following description will focus on a method for ensuring long-term fairness and short-term fairness based on the above contention-based scheduling scheme.

In accordance with the above contention-based scheduling scheme, each adjacent BS generates a random contention number and transmits the contention number to a UE on a BBC. Then each UE selects a winner from among the adjacent BSs and reports the winner on a BIC. Each BS determines whether it can use the next time unit (e.g. a frame) according to received BICs. In this manner, BSs share time resources in a distributed manner.

When this contention-based scheduling scheme is adopted, a BS that has lost a contention may not communicate with UEs at all for n frames. That is, if one BS loses successive contentions, it may not transmit signals in any of a few frames and thus may not support voice and multimedia services reliably.

In the case where BSs share time resources in a distributed manner, the amount of time resources to be allocated to each BS is an issue to be handled. For instance, if two BSs are competing and one of the BSs has a larger number of users than the other BS, it may be unfair to allocate equal time resources to the BSs.

Therefore, BSs are prioritized and contention numbers are set based on the priority levels of the BSs in order to ensure fairness in an embodiment of the present invention.

For example, it is assumed that a Contention Window (CW) size is 1024 and a BS having a lowest contention number wins a contention. On this assumption, a BS with a lowest priority level extracts a contention number randomly from a class having a range of [768, 1024], a BS with the next lowest priority level and a BS with the third lowest priority level extract contention numbers randomly from a class having a range of [512, 768) and a class having a range of [256, 512). A BS having a highest priority level selects a contention number randomly from a class having a range of [0, 256).

Adjacent BSs may be prioritized as follows.

The same priority level is assigned to each BS or different priority levels are assigned to BSs according to the numbers of users that they serve. For example, when two BSs compete with each other, 0.5 of a time slot is assigned to each BS irrespective of the numbers of users accommodated in the BSs in the former prioritization scheme and the number of time slots assigned to each BS is proportional to the number of users that the BS serves in the latter prioritization scheme. In general, assignment of time slots to a BS according to the number of users serviced by the BS is fair in a long term. Therefore, BSs are prioritized according to the numbers of UEs serviced by them in an embodiment of the present invention.

Let the ratio of time slots to be allocated to BSx in the latter prioritization scheme be denoted by $f_x$. Then $f_x$ is calculated by $$f_x = \frac{n_x}{\sum_{i \in N} n_i}$$ [Equation 3]

where $n_x$ denotes the number of UEs accommodated in BSx and N denotes the total set of adjacent BSs including BSx. The number of users within an adjacent BS may be known through a backbone or with the aid of a UE.

In an embodiment of the present invention, the number of time units (e.g. the number of time slots), $W_x$ during which BSx has been idle without signal transmission and reception is taken into account, in addition to the number of UEs within BSx. This is because short-term fairness is ensured by assigning a high priority level to a BS that has not transmitted or received signals for long.

Hence, the default priority level $DP_x$ of each BS is determined by the following equation in an embodiment of the present invention.

$$DP_x = \lfloor f_x(W_x+1) \rfloor$$ [Equation 4]

Figure 17:
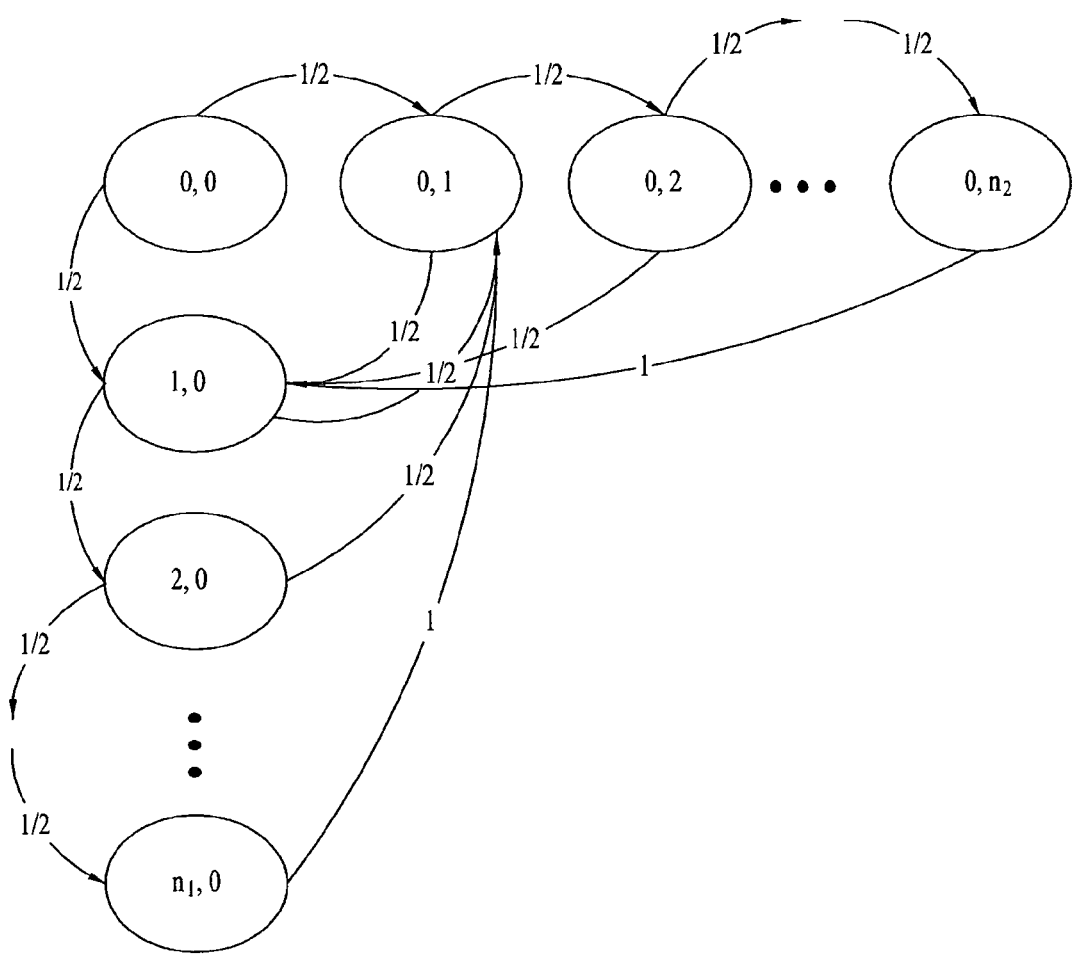
FIG. 17 illustrates a Markov Chain model referred to for describing a case of using a default priority scheme (DP scheme) according to an embodiment of the present invention.

FIG. 17 illustrates a Markov Chain model referred to for describing a case of using the default priority scheme (hereinafter, referred to as DP scheme) according to an embodiment of the present invention.

Referring to FIG. 17, it is assumed that there are two BSs, each BS serving the same number of UEs. If the number of time units during which BS1 has been idle without transmitting or receiving signals is $W_1$ and the number of time units during which BS2 has been idle without transmitting or receiving signals is $W_2$, the Markov Chain value is expressed as ($W_1$, $W_2$). Hence, the Markov Chain value for BS1 and BS2 starts with (0,0).

When BS1 transmits or receives a signal in a first time unit, $W_1$ and $W_2$ may be set to 0 and 1, respectively for the next time unit. In the opposite case, when BS2 transmits or receives a signal in the first time unit, $W_1$ and $W_2$ may be set to 1 and 0, respectively for the next time unit.

In FIG. 17, an occurrence probability and a ($W_1$, $W_2$) combination are illustrated for each case. If the number of time units during which BS1 has been idle, $W_1$ increases to $n_1$, the probability of signal transmission and reception in the next time unit is 1 according to [Equation 4] and thus the ($W_1$, $W_2$) combination for the next time unit is (0, 1), for BS1. In the same manner, if the number of time units during which BS2 has been idle, $W_2$ increases to $n_2$, the probability of signal transmission and reception in the next time unit is 1 according to [Equation 4] and thus the ($W_1$, $W_2$) combination for the next time unit is (1, 0), for BS2.

Because $DP_1$ and $DP_2$ are both 0 until $W_1$ or $W_2$ reaches $n_1$ or $n_2$ in [Equation 4], the winning probabilities of BS1 and BS2 are equally ½. Then if $W_1$ reaches $n_1$, $DP_1$ and $DP_2$ are 1 and 0, respectively. Hence, the winning probability of BS1 is 1. If $W_2$ reaches $n_2$, $DP_1$ and $DP_2$ are 0 and 1, respectively. Hence, the winning probability of BS2 is 1.

In the case where the DP scheme expressed as [Equation 4] is used, the number of time units during which a BS has been idle is taken into account in determining the priority level of the BS. Hence, fairness can be ensured. In addition, since $f_x$ is proportional to the number of UEs within each BS, a BS having a large number of UEs may be fast ranked higher in default priority according to an increase in the number of time units during which the BS has been idle, thereby achieving fairness.

In accordance with an embodiment of the present invention, the concept of a complementary level $P_x$ is proposed.

$P_x = DP_x$ (with probability 1-$f_x$)

$DP_x+1$ (with probability $f_x$) [Equation 5]

The complementary level $P_x$ of a BS is determined, additionally taking into account the number of UEs serviced by a BS, $f_x$ after the default priority level $DP_x$ of the BS is determined, in order to ensure long-term fairness. That is, BSx has a priority level $DP_x+1$ for probability $f_x$ and a priority level $DP_x$ for probability 1-$f_x$.

Figure 18:
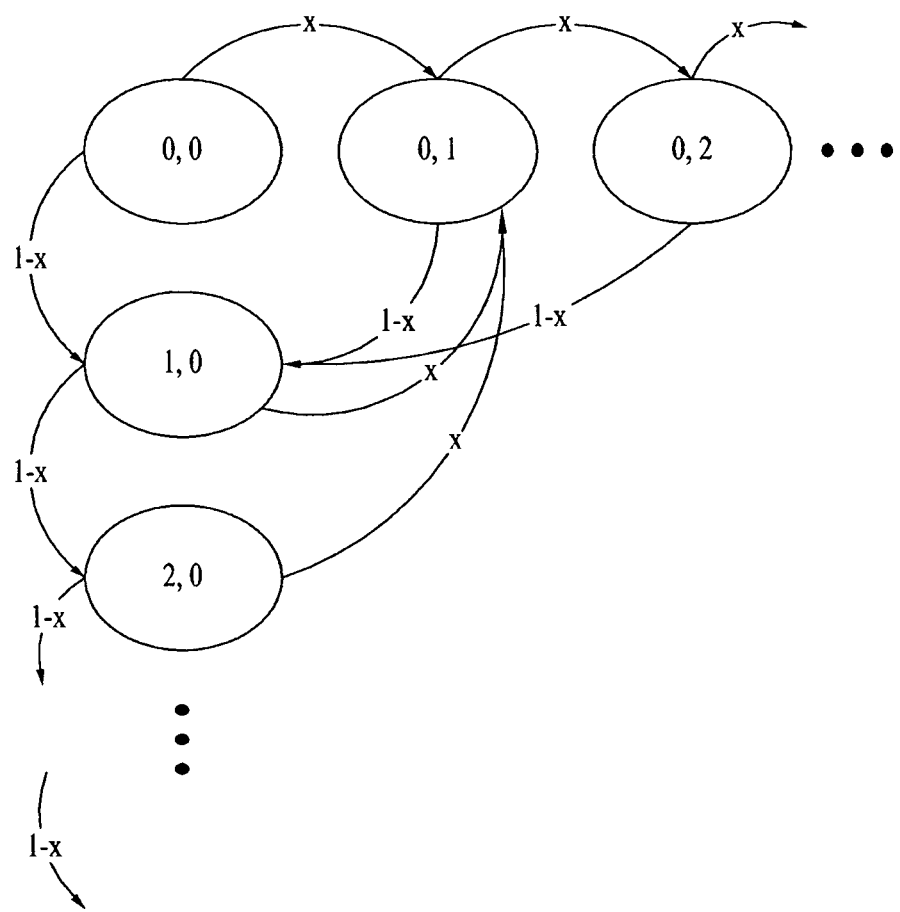
FIG. 18 illustrates a Markov Chain model referred to for describing a case of using only a complementary priority scheme (PC scheme) according to an embodiment of the present invention.

FIG. 18 illustrates a Markov Chain model referred to for describing a case of using only the complementary priority scheme (referred to as PC scheme).

Referring to FIG. 18, it is assumed that there are two BSs, and $f_x$ of BS2, $f_2$ is set to x and $f_x$ of BS1, $f_1$ is set to 1-x according to the numbers of UEs serviced by BS1 and BS2. While [Equation 5] additionally takes a ratio of UEs in each BS, $f_x$ into account after the default priority level DPx of the BS is determined, FIG. 18 is about a case where only the PC scheme using two default priority levels and $f_x$ is employed. In this case, the priority level of a BS is determined by $P_x = 0$ (with probability 1-$f_x$)

1 (with probability $f_x$) [Equation 6]

A combination of the numbers of time units during which the BSs have been idle starts with (0, 0). If only the PC scheme expressed as [Equation 6] is used, the numbers of time units during which the BSs have been idle are not considered. Hence, the winning probability of BS1 is always 1-x and the winning probability of BS2 is always x in FIG. 18. The combination (0, 0) may be changed to a next combination (0, 1) because BS2 has a higher complementary priority level with probability x according to [Equation 6]. In the mean time, BS1 may have a higher priority level with probability 1-x. Then the next combination may be (1, 0). For the combinations (0, 1) and (1, 0), the BSs have the same winning probability. Accordingly, BS1 continues winning contentions with probability 1-x and BS2 continues winning contentions with probability x.

Figure 19:
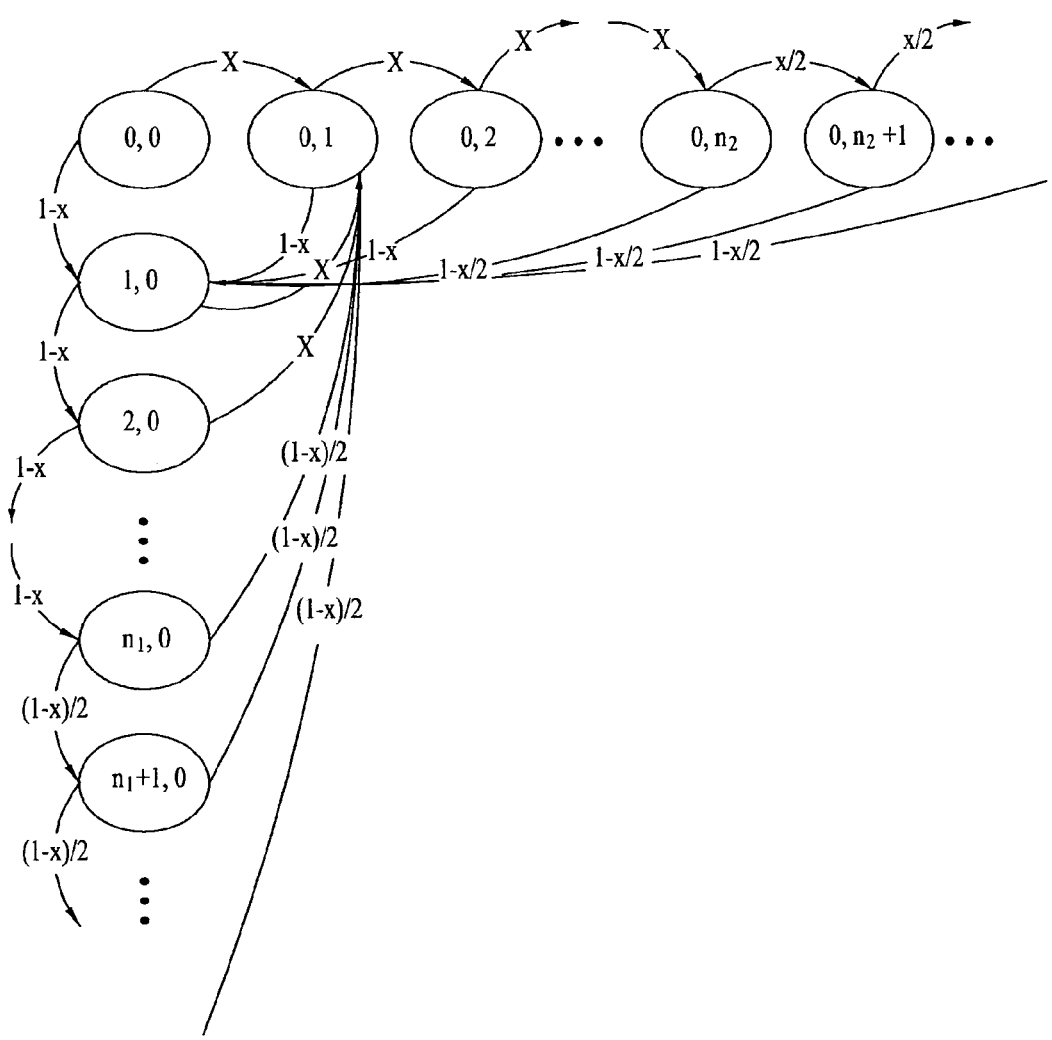
FIG. 19 illustrates a Markov Chain model referred to for describing a case of using the PC scheme in addition to the DP scheme.

FIG. 19 illustrates a Markov Chain model referred to for describing a case of using the PC scheme in addition to the DP scheme.

Referring to FIG. 19, it is assumed that there are two BSs, and $f_x$ of BS2, $f_2$ is set to x and $f_x$ of BS1, $f_1$ is set to 1-x according to the numbers of UEs serviced by BS1 and BS2. As noted from [Equation 5], it is assumed that the ratio of UEs in each BS, $f_x$ is additionally taken into account after the default priority level $DP_x$ of the BS is determined. FIG. 19 is about a case where the priority level of a BS is indicated by 1-bit signaling.

Compared to the case illustrated in FIG. 18, if a BS continuously transmits or receives signals, the number of time units during which the other BS is idle is increasing. In addition, if signal transmission and reception of a specific BS is repeated a predetermined number of or more times, the probability of signal transmission and reception of the BS is dropped to ½. For instance, when BS1 with probability x transmits or receives signals successively $n_2$ times in the state of (0, 0) and BS2 is idle for the same time period, the probability of winning following contentions continuously is x/2 for BS1.

Figure 20:
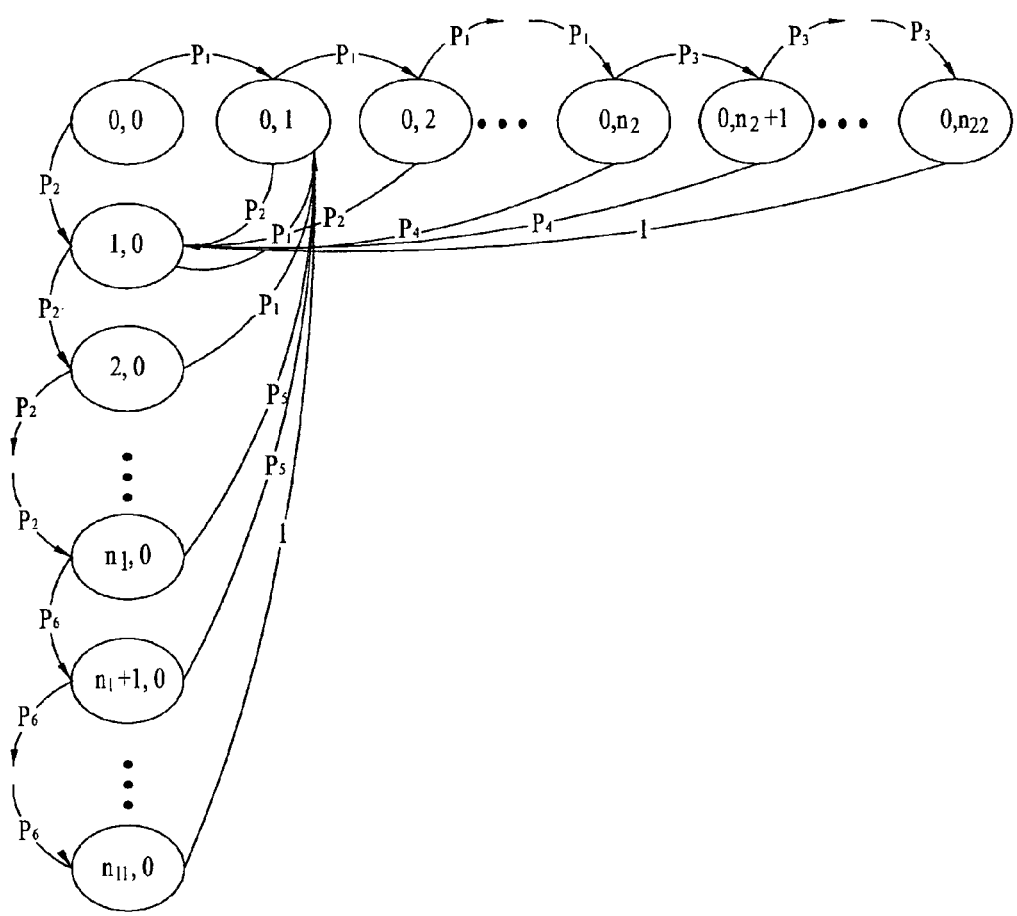
FIG. 20 illustrates a Markov Chain model referred to for describing a case where the PC scheme is used in addition to the DP scheme, when a priority level is represented in a plurality of bits according to an embodiment of the present invention.

FIG. 20 illustrates a Markov Chain model referred to for describing a case where the PC scheme is used in addition to the DP scheme, when a priority level is indicated in a plurality of bits according to an embodiment of the present invention.

Similarly to the case of FIG. 19, if a specific BS continues transmission, the probability of transmitting a signal at the next time by the BS is reduced. However, because a priority level is expressed in two bits, if a BS continues transmission a predetermined number of or more times, the winning probability of the BS is decreased over a plurality of steps and finally reaches a point where the other BS has a winning probability of 1. For example, if BS1 with probability $p_2$ has won contentions successively $n_2$ times, the winning probability of BS1 is reduced to $p_4$ ($p_4<p_2$). This probability decrease may take a plurality of steps according to the number of bits allocated to express a priority level.

If BS1 wins $n_{22}$ successive contentions, BS2 wins the next contention with probability 1.

In summary, the concept of the DP scheme is introduced to assign a high priority level to a BS that has waited long, and the concept of the PC scheme is proposed to assign a high priority level to a BS that should service a large number of UEs relative to its adjacent BSs.

To implement the DP scheme and the PC scheme, at least three priority levels are preferably defined because two classes are distinguished by the DP scheme and one more class is defined by the PC scheme. Thus 2 bits may be required to represent priority levels. Needless to say, if more priority levels are defined, a plurality of BSs may be prioritized more efficiently for contention.

However, considering radio resources are limited and contention numbers for a contention should be delivered to every UE, using 2 bits for representing a priority level may impose a constraint. Therefore, in the case where priority levels are represented in 1 bit, the performances of the above-described embodiments of the present invention are verified as follows.

To represent a priority level in 1 bit, the proposed prioritization schemes may be combined. The DP scheme, the PC scheme or both may be applied. The highest priority level may be 1 and the lowest priority level may be 0. In a simple situation where only two BSs compete with each other, the mathematical analysis results of 1-bit prioritization are given below.

TABLE 1

|  | 1 bit DP only | 1 bit PC only | 1 bit DP + PC | 2 bit DP + PC |
|---|---|---|---|---|
| average error | 0.424932 | 0 | 0.099217 | 0.075952 |

TABLE 2

1 bit DP only (average error is 0.42)

| f1 | f2 | BS1 | BS2 | Var(W1) | Var(W2) | error |
|---|---|---|---|---|---|---|
| 0.1 | 0.9 | 0.334 | 0.666 | 1.9342 | 0.25 | 1.299 |
| 0.2 | 0.8 | 0.348 | 0.652 | 1.1093 | 0.2489 | 0.462 |
| 0.3 | 0.7 | 0.364 | 0.636 | 0.6874 | 0.2449 | 0.152 |
| 0.4 | 0.6 | 0.4 | 0.6 | 0.25 | 0.2222 | 0 |
| 0.5 | 0.5 | 0.5 | 0.5 | 0 | 0 | 0 |

TABLE 3

1 bit PC only (average error is 0)

| f1 | f2 | BS1 | BS2 | Var(W1) | Var(W2) | error |
|---|---|---|---|---|---|---|
| 0.1 | 0.9 | 0.1 | 0.9 | 90.337 | 0.1235 | 0 |
| 0.2 | 0.8 | 0.2 | 0.8 | 20.024 | 0.3123 | 0 |
| 0.3 | 0.7 | 0.3 | 0.7 | 7.7808 | 0.6122 | 0 |
| 0.4 | 0.6 | 0.4 | 0.6 | 3.7507 | 1.1106 | 0 |
| 0.5 | 0.5 | 0.5 | 0.5 | 2.0018 | 1.9993 | 0 |

TABLE 4

1 bit DP + PC (average error is 0.10)

| f1 | f2 | BS1 | BS2 | Var(W1) | Var(W2) | error |
|---|---|---|---|---|---|---|
| 0.1 | 0.9 | 0.14 | 0.86 | 13.341 | 0.1532 | 0.2211 |
| 0.2 | 0.8 | 0.252 | 0.748 | 3.5544 | 0.2986 | 0.1634 |
| 0.3 | 0.7 | 0.324 | 0.676 | 2.1772 | 0.4188 | 0.0574 |
| 0.4 | 0.6 | 0.402 | 0.598 | 1.2372 | 0.5564 | 0.0048 |
| 0.5 | 0.5 | 0.5 | 0.5 | 0.6665 | 0.6671 | 0 |

TABLE 5

2 bit DP + PC (average error is 0.08)

| f1 | f2 | BS1 | BS2 | Var(W1) | Var(W2) | error |
|---|---|---|---|---|---|---|
| 0.1 | 0.9 | 0.135 | 0.865 | 11.568 | 0.1336 | 0.197 |
| 0.2 | 0.8 | 0.242 | 0.758 | 2.5221 | 0.23 | 0.132 |
| 0.3 | 0.7 | 0.308 | 0.692 | 1.4015 | 0.2854 | 0.019 |
| 0.4 | 0.6 | 0.386 | 0.614 | 0.6715 | 0.3408 | 0.029 |
| 0.5 | 0.5 | 0.5 | 0.5 | 0.2739 | 0.2739 | 0 |

Table 2 to Table 5 list error rates in the cases of 1-bit DP, 1-bit PC, 1-bit DP and PC, and 2-bit DP and PC, when the ratios ($f_x$) of users, ($f_1$, $f_2$) are (0.1, 0.9), (0.2, 0.8), (0.3, 0.7), (0.4, 0.6), and (0.5, 0.5). From the perspective of long-term fairness, an error represents how different the time occupancies of BSs are from ($f_1$, $f_2$). Therefore, the error rate is 0 if only the PC scheme is used. However, short-term fairness, that is, a BS's using time resources successively is not considered. [Table 1] lists average error rates according to the schemes.

The 1-bit DP only scheme has a very high error rate.

The 1-bit DP+PC scheme offers a desired result with an error of about 9.9%, and the 2-bit DP+PC scheme has an error of 7.6%.

While the above embodiments of the present invention have been described with the appreciation that a priority level is represented explicitly in a predetermined number of bits, the priority level may not be indicated explicitly in another embodiment of the present invention. For example, if 1024 random contention numbers are available, priority classes may be mapped to [0, 341], [342, 682], [683, 1024] to thereby indicate a priority level without explicit signaling. Each BS selects a contention number from a priority class corresponding to its priority level and a UE may determine a winning BS based on received contention numbers or broadcast a contention number having the highest priority level.

Operations of a UE and a BS based on the above-described prioritization according to an embodiment of the present invention will be described below.

In accordance with an embodiment of the present invention, each BS should acquire a BBC/BIC pair in order to get an opportunity to transmit a signal. For acquisition of a BCC/BIC pair, the BS may collect BBC/BIC information for a time period, select a channel randomly from among BBCs/BICs, and attempt to transmit contention number information on the selected channel. If the BS collides with another BS on the selected BBC, the BSs using the BBC may perform a BBC/BIC pair acquisition procedure, select BBC/BIC pairs, and transmit contention number information on the selected BBCs. Each BS may continue this operation until it acquires a collision-free BBC/BIC pair.

Collision on a BCC may be determined through a BIC or an RACH with the aid of a UE. A BBC/BIC pair is initially acquired once, and then again upon collision.

In another embodiment of the present invention, a contention number is transmitted on a current defined channel without the BBC/BIC pair acquisition procedure. For instance, the afore-described priority level information and contention number information may be transmitted in all or part of spare MIB bits of a PBCH. Alternatively or additionally, the positions of the priority level information and the contention number information in a PDCCH or PDSCH are indicated by a PBCH and a contention number is transmitted on the PDCCH or PDSCH.

As far as each BS transmits priority level information and a contention number selected from a priority class corresponding to its priority level and a UE selects a BS to communicate in a next time interval, the present invention is not limited to a specific scheme.

The priority level information and the contention number information selected based on the priority level information may have the following format.

Figure 21:
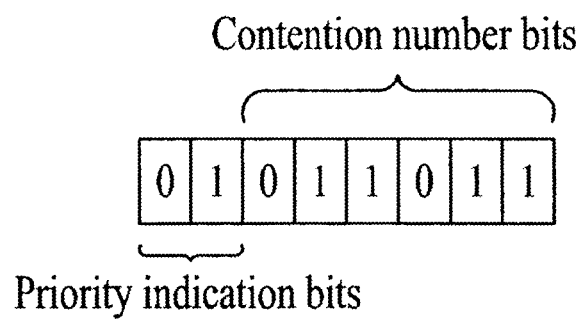
FIG. 21 illustrates an exemplary format of contention number information that a BS transmits to a UE according to an embodiment of the present invention.

FIG. 21 illustrates an exemplary format of contention number information that a BS transmits to a UE according to an embodiment of the present invention.

Referring to FIG. 21, the priority level of a BS is indicated in 2 bits and a content number that the BS selected from a class corresponding to the priority level is transmitted in 6 bits. However, the present invention is not limited to such specific numbers of bits.

For example, if it is regulated that a BS which has transmitted a highest contention number wins a contention, contention numbers within a range of [0, 256) are divided into four classes [0, 64), [64, 128), [128, 192), and [192, 256). A BS may select a contention number from [0, 64) for priority level 0, from [64, 128) for priority level 1, from [128, 192) for priority level 2, and from [192, 256) for priority level 3. On the other hand, if it is regulated that a BS which has transmitted a lowest contention number wins a contention, the mapping relationship between priority levels and classes may be set in the opposite manner to the above mapping relationship.

If only one contention number is decoded, a UE may determine that a single BS attempts to transmit a signal without any competing BS and thus may notify the BS that it has won the contention (in an embodiment where a winner is notified) or may not perform any operation (in an embodiment where a loser is notified).

Upon receipt of a plurality of contention numbers, the UE may determine a winning BS from priority indication parts of contention number information received from a plurality of BSs, if the contention number information include priority indication parts. If the BSs have the same priority, the UE may select a winner by checking the contention numbers of the BSs.

While priority level information and its related contention number information are transmitted in a single format in FIG. 21, they may be transmitted on different channels.

In this manner, a BS winning a contention may transmit or receive signals in a next time interval, while a BS losing the contention may not transmit or receive signals in the next time interval.

Now a description will be given a BS apparatus and a UE apparatus for performing contention-based scheduling and transmitting and receiving signals based on the scheduling according to the above-described embodiments of the present invention.

Figure 22:
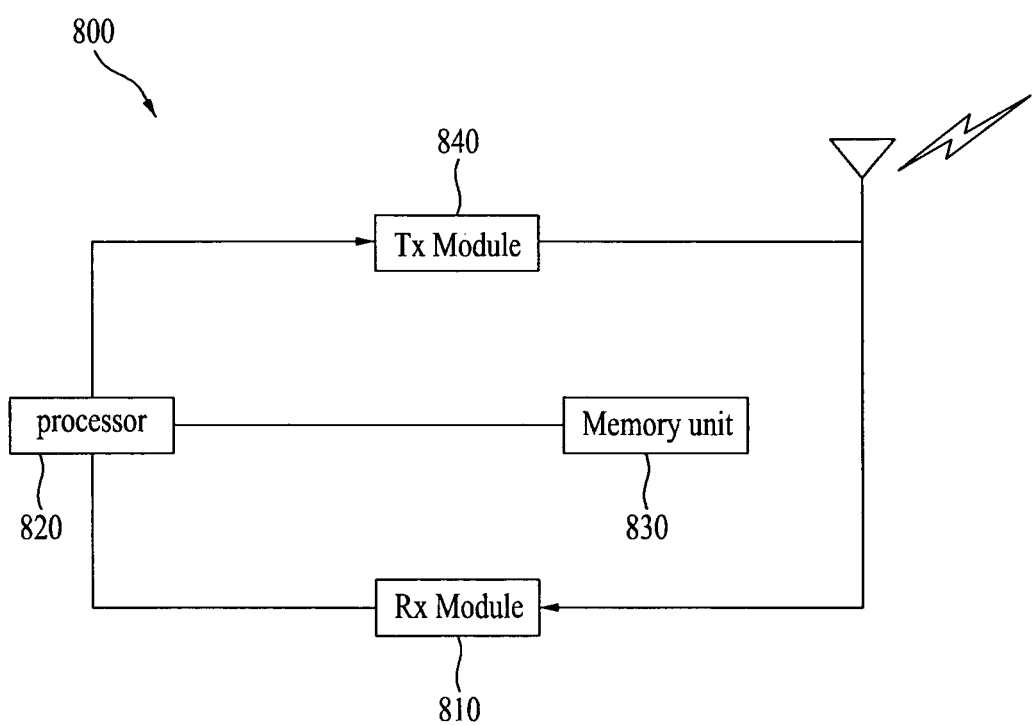
FIG. 22 is a block diagram of a BS apparatus or a UE apparatus according to an embodiment of the present invention.

FIG. 22 is a block diagram of a BS apparatus or a UE apparatus according to an embodiment of the present invention.

Referring to FIG. 21, a BS or UE apparatus 800 may include a Tx module 840, an Rx module 810, and a processor 820. The BS or UE apparatus 800 may further include a memory 830 for temporarily storing contention number information, priority level information, etc. The Tx module 840 and the Rx module 810 are used to transmit and receive signals between a BS and a UE.

If the apparatus 800 is a BS, the processor 820 may select a random number from a class corresponding to a priority level of the BS among classes corresponding to a predetermined number of priority levels. The priority level of the BS may be determined according to the DP scheme expressed as [Equation 5] and the PC scheme expressed as [Equation 6]. The processor 820 of the BS may select a random number from the class corresponding to the determine priority level and transmit information about the priority level and information about the contention number to a UE through the Tx module 840.

If the apparatus 800 is a UE, the Rx module 810 of the UE may receive priority level information and contention number information from BSs. Upon receipt of a single contention number, the processor 820 of the UE may determine that a single BS is participating in a contention and thus may notify the BS that it has won the contention (in an embodiment where a winner is notified) or may not perform any operation (in an embodiment where a loser is notified).

Upon receipt of a plurality of contention numbers through the Rx module 810, the processor 820 of the UE may determine a winning BS from priority indication parts of contention number information received from a plurality of BSs, if the priority indication parts are different. If the BSs have the same priority, the processor 820 of the UE may select a winner by checking the contention numbers of the BSs.

The Tx module 840 of the UE may transmit contention information to a winner and losers according to the decision result of the processor 820.

Accordingly, the BS winning the contention may transmit or receive signals in a predetermined time interval, while the BS losing the contention may not transmit or receive signals in the time interval.

MODE FOR INVENTION

Various embodiments have been described in the best mode for carrying out the invention.

INDUSTRIAL APPLICABILITY

The present invention is applicable to a variety of communication systems as well as a 3GPP LTE system.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. For example, an embodiment of the present invention may be constructed by combining components or configurations of the above-described embodiments of the present invention.

Accordingly, the invention should not be limited to the specific embodiments described herein, but should be accorded the broadest scope consistent with the principles and novel features disclosed herein.

The invention claimed is:

1. A method for controlling downlink signal transmissions of a plurality of Base Stations (BSs) adjacent to a User Equipment (UE) based on contention between the plurality BSs, the method comprising:
    receiving, from each of the plurality BSs, a channel carrying inter-BS contention information for downlink signal transmission in an $(n+1)^{th}$ time unit, n being an integer;
    broadcasting to the plurality of BSs a contention number with a highest priority level among contention numbers extracted from the inter-BS contention information; and
    receiving a downlink signal from a BS of the plurality BSs that transmitted inter-BS contention information related to the contention number with the highest priority level in the $(n+1)^{th}$ time unit.

2. The method according to claim 1, wherein the channel carrying the inter-BS contention information is a Physical Broadcast Channel (PBCH) and the inter-BS contention information is included in a Master Information Block (MIB).

3. The method according to claim 2, wherein the MIB includes downlink system information, Physical Hybrid-ARQ Indicator Channel (PHICH)-related information, a System Frame Number (SFN), and the inter-BS contention information, and
    wherein the inter-BS contention information includes 1-bit information indicating whether the BS supports contention mode, 1-bit information indicating whether the BS is operating in the contention mode, and 1-bit information indicating whether the BS transmits a downlink signal in an $n^{th}$ time unit.

4. The method according to claim 3, wherein the inter-BS contention information further includes contention number information.

5. The method according to claim 3, wherein the inter-BS contention information further includes contention number information, and the reception of a channel carrying inter-BS contention information comprises receiving the contention number information separately on a plurality of PBCHs.

6. The method according to claim 3, wherein the inter-BS contention information further includes information about a position of a contention number in a PDCCH.

7. The method according to claim 1, wherein the inter-BS contention information includes information indicating whether the BS of the plurality BSs is operating in contention mode and information required for extracting a contention number.

8. The method according to claim 7, wherein the information required for extracting a contention number is one of the contention number, an input value to a function stored in the UE and the plurality of BSs, for extraction of a contention number, and information about a channel carrying the contention number.

9. The method according to claim 7, wherein the information required for extracting the contention number is information about a channel carrying the contention number, and wherein the reception of a channel carrying inter-BS contention information comprises receiving the inter-BS contention information on the channel and receiving the contention number on a Physical Downlink Control CHannel (PDCCH).

10. The method according to claim 1, wherein the broadcasting comprises broadcasting the contention number with the highest priority level as a tone signal to the plurality of BSs K times repeatedly, K being a natural number.

11. The method according to claim 10, wherein if the number of the plurality of BSs adjacent to the UE is L, a distance between a $k^{th}$ BS and the UE is d, a path loss index is, an antenna gain is A, and a threshold power for detecting the tone signal is detected is $P_{th}$, transmission power of the tone signal for the $k^{th}$ BS is computed by the following equation, $$P_k=(d^\alpha/A)P_{th} \text{ where } k=0,1,\ldots,L-1,$$

and transmission power of the tone signal is determined by the following equation, $P_{tone}=\max\{P_1, P_2, \ldots P_k, \ldots, P_L\}$.

12. The method according to claim 1, wherein the broadcasting comprises additionally broadcasting information indicating the presence or absence of a BS that does not perform the contention-based downlink signal transmission control among the plurality of BSs adjacent to the UE.

13. The method according to claim 1, wherein the reception of a channel carrying inter-BS contention information comprises receiving from the each of the plurality of BSs information about a number selected randomly from a class corresponding to a priority level of the each of the plurality of BSs among classes corresponding to a predetermined number of priority levels, and
    wherein the priority level of the each of the plurality of BSs is determined according to a number of UEs within the each of the plurality of BSs and a number of time units during which the each of the plurality of BSs has been idle without signal transmission before the $(n+1)^{th}$ time unit.

14. The method according to claim 13, wherein the priority level of the each of the plurality of BSs is determined according to a default priority level of the each of the plurality of BSs, expressed as $f_x(W_x+1)$ where $f_x$ denotes a ratio of dividing a total number of UEs within the plurality of BSs adjacent to the UE by the number of UEs within the each of the plurality of BSs and $W_x$ denotes the number of time units during which the each of the plurality of BSs has been idle without signal transmission before the $(n+1)^{th}$ time unit.

15. The method according to claim 14, wherein the priority level of the each of the plurality of BSs is determined according to a complementary priority level of the each of the plurality of BSs, expressed as $P_x=DP_x$(with probability $1-f_x$) $DP_x+1$ (with probability $f_x$) where $P_x$ denotes the complementary priority level of the each of the plurality of BSs and $DP_x$ denotes the default priority level of the each of the plurality of BSs.

16. The method according to claim 13, wherein the predetermined number of priority levels is 2 and a most significant bit of the information about the selected number indicates a priority level.

17. The method according to claim 13, wherein the predetermined number of priority levels is 4 and two most significant bits of the information about the selected number indicates a priority level.

18. A User Equipment (UE) apparatus for controlling downlink signal transmissions of a plurality of Base Stations (BSs) adjacent to the UE based on contention between the plurality of BSs, the UE apparatus comprising:
  a receiver for receiving, from each of the plurality BSs, a channel carrying inter-BS contention information for downlink signal transmission in an $(n+1)^{th}$ time unit, being an integer; and
  a transmitter for broadcasting to the plurality of BSs a contention number with a highest priority level among contention numbers extracted from the inter-BS contention information,
  wherein the receiver receives a downlink signal from a BS of the plurality BSs that transmitted inter-BS contention information related to the contention number with the highest priority level in the $(n+1)^{th}$ time unit.

19. The UE apparatus according to claim 18, wherein the channel carrying the inter-BS contention information is a Physical Broadcast Channel (PBCH) and the inter-BS contention information is included in a Master Information Block (MIB).

\* \* \* \* \*